(12) United States Patent
Franksson et al.

(10) Patent No.: US 9,289,929 B2
(45) Date of Patent: Mar. 22, 2016

(54) MOULDING ARRANGEMENT AND A METHOD FOR PRODUCING AN ARTICLE USING THE MOULDING ARRANGEMENT

(75) Inventors: Olof Franksson, Danderyd (SE); Robert Axelsson, Granna (SE)

(73) Assignee: PTAH AB, Danderyd (SE)

( * ) Notice: Subject to any disclaimer, the term of this patent is extended or adjusted under 35 U.S.C. 154(b) by 0 days.

(21) Appl. No.: 14/342,782

(22) PCT Filed: Sep. 5, 2012

(86) PCT No.: PCT/EP2012/067342
§ 371 (c)(1),
(2), (4) Date: Mar. 4, 2014

(87) PCT Pub. No.: WO2013/034604
PCT Pub. Date: Mar. 14, 2013

(65) Prior Publication Data
US 2014/0239544 A1    Aug. 28, 2014

(30) Foreign Application Priority Data
Sep. 5, 2011  (EP) .................................. 11180068

(51) Int. Cl.
*B29C 45/14* (2006.01)
*B29C 45/16* (2006.01)
*B29C 45/38* (2006.01)
*B29C 45/40* (2006.01)
*B29C 45/26* (2006.01)

(52) U.S. Cl.
CPC ......... *B29C 45/14467* (2013.01); *B29C 45/162* (2013.01); *B29C 45/1615* (2013.01); *B29C 45/2681* (2013.01); *B29C 45/38* (2013.01); *B29C 45/401* (2013.01); *B29C 45/2606* (2013.01)

(58) Field of Classification Search
CPC   B29C 45/14467; B29C 45/38; B29C 45/401; B29C 45/2681; B29C 45/162
USPC ........................ 425/112, 588; 264/255, 297.8
See application file for complete search history.

(56) References Cited

U.S. PATENT DOCUMENTS

| | | | |
|---|---|---|---|
| 3,702,750 A | 11/1972 | Bessolo | |
| 4,907,548 A | 3/1990 | Lee | |

(Continued)

FOREIGN PATENT DOCUMENTS

| | | | |
|---|---|---|---|
| DE | 42 43 293 A1 | 6/1994 | |
| GB | 1 392 073 | 4/1975 | |

(Continued)

OTHER PUBLICATIONS

International Search Report, PCT/EP2012/067342, mailed Mar. 12, 2013.

*Primary Examiner* — Edmund Lee
(74) *Attorney, Agent, or Firm* — Winston & Strawn LLP

(57) ABSTRACT

A molding arrangement serves for molding articles at each stroke of an injection-molding machine in which an injection mold is mounted. The articles are composed of components made of different materials in cavities formed in the injection mold, with each cavities corresponding to the shape of a component whereby identical cavities are separated by angular distances and placed at equal distances from a central axis of the injection mold and parts of the cavities are formed in a separately movable section of the movable mold half. The injection molding arrangement includes an operation part for displacing the section to-and-fro between closed and open positions of the injection mold and in open positions to turn the section about the central axis angles corresponding to the angles between the cavities to form whole cavities in the injection mold in closed position.

22 Claims, 21 Drawing Sheets

(56) References Cited

U.S. PATENT DOCUMENTS 7,670,125 B2  3/2010  Armbruster
8,297,967 B2 * 10/2012  Huang .................... 425/556

FOREIGN PATENT DOCUMENTS

| GB | 1 392 074 | 4/1975 |
|----|-----------|--------|
| JP | 2003025376 | 1/2003 |

* cited by examiner

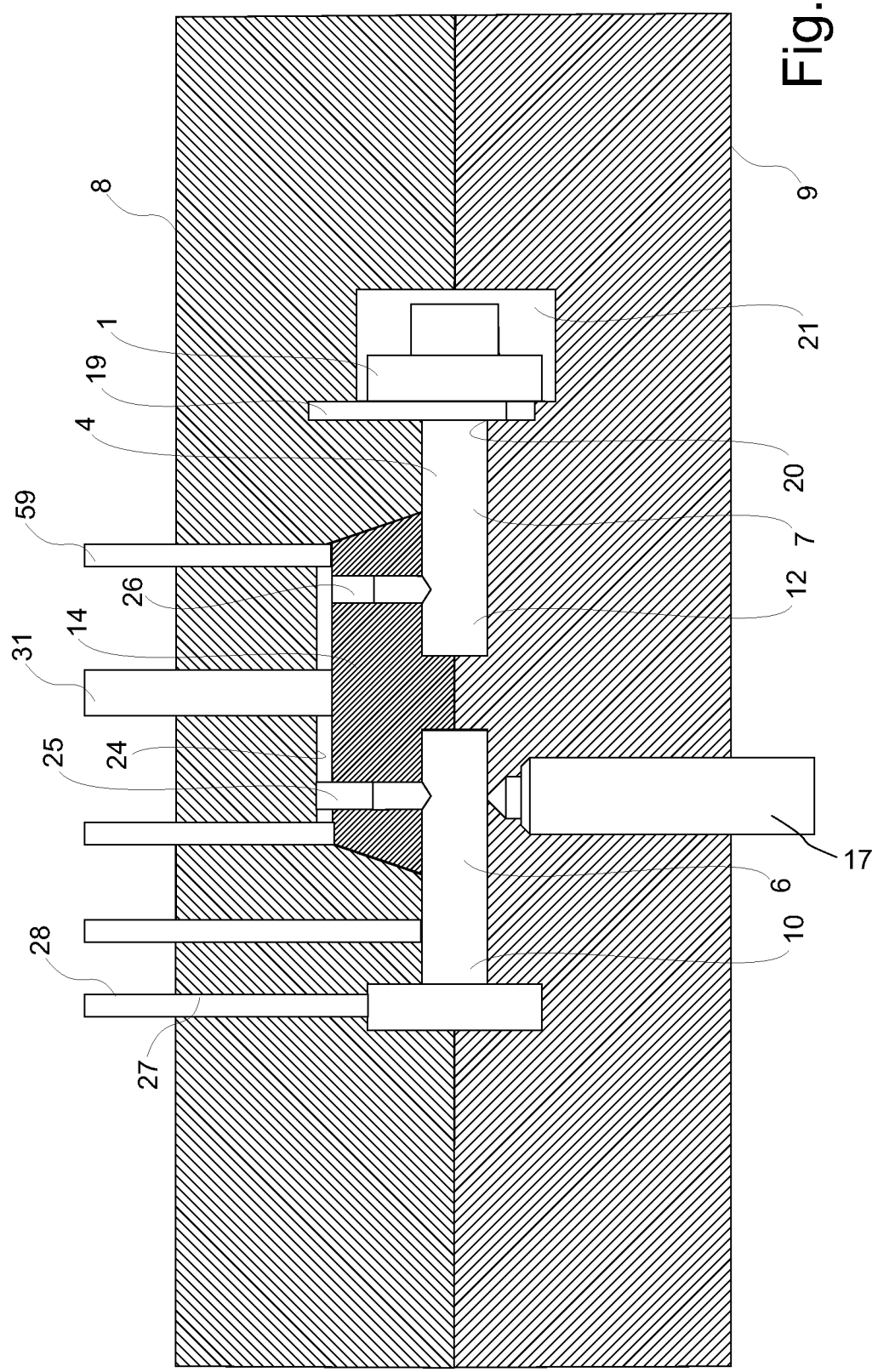

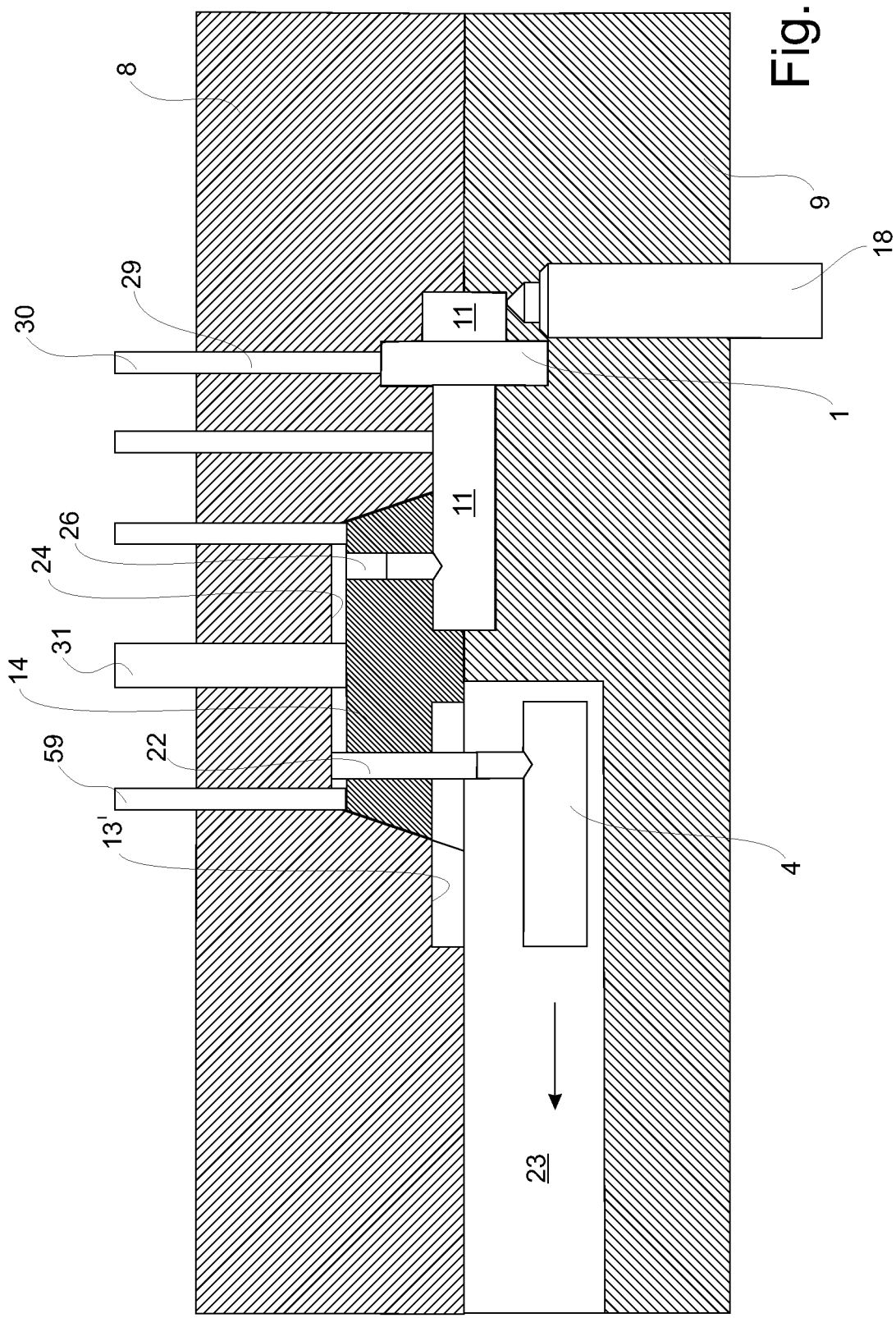

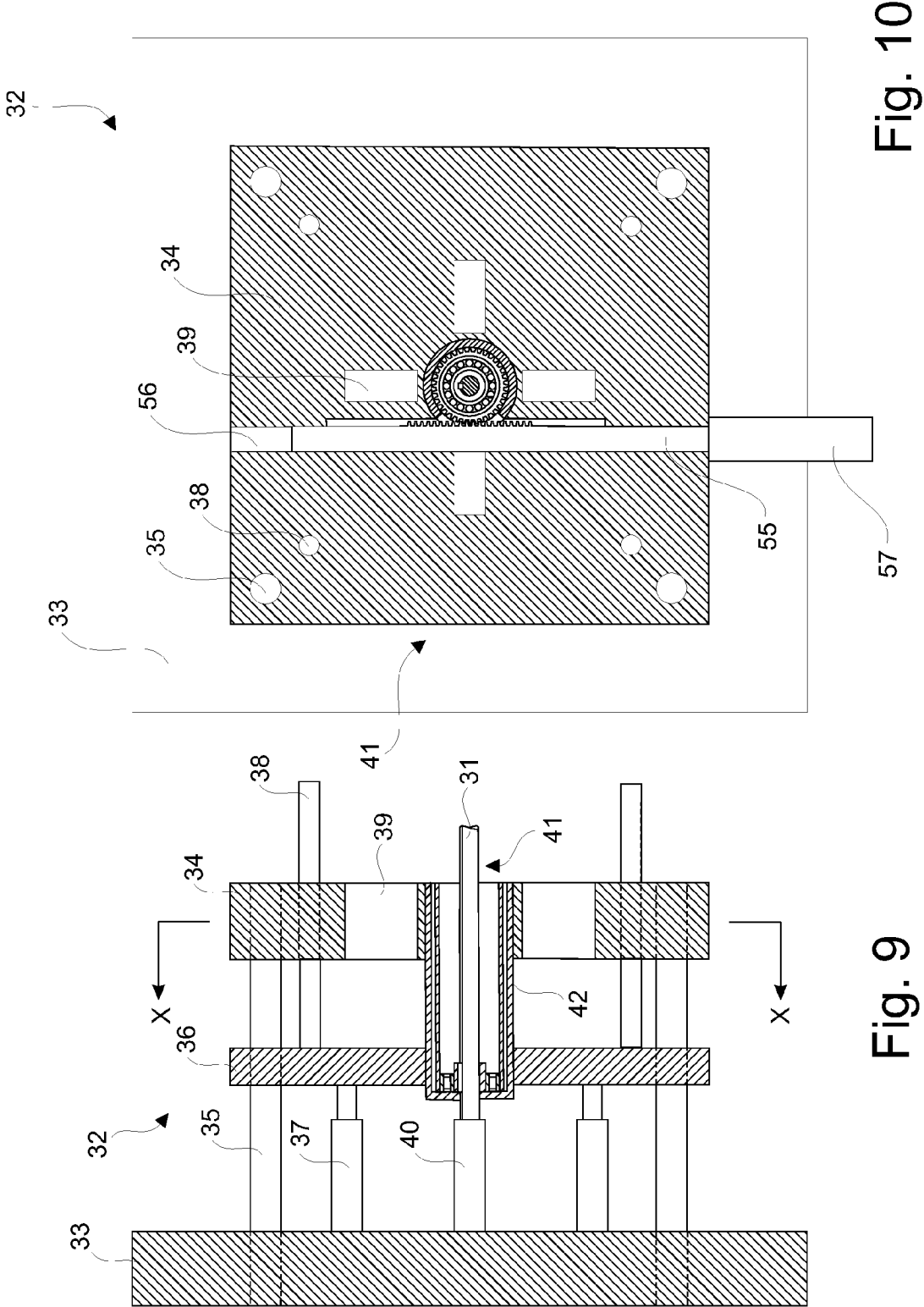

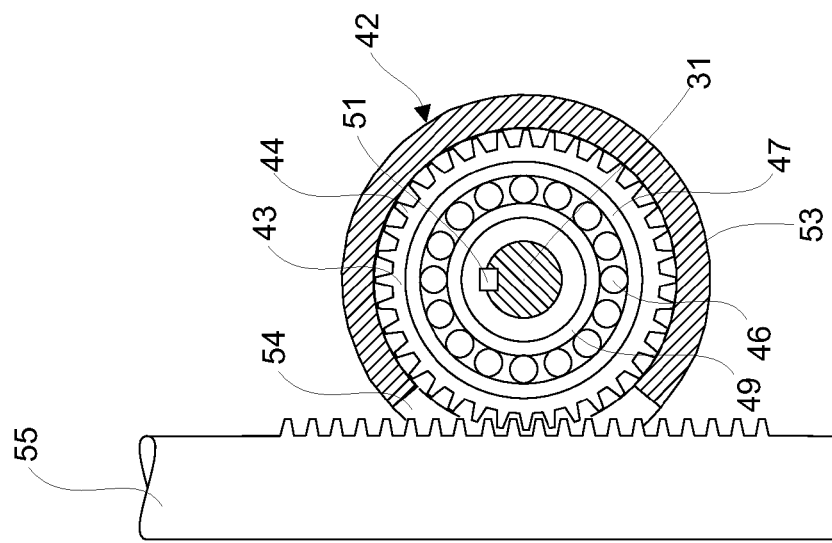
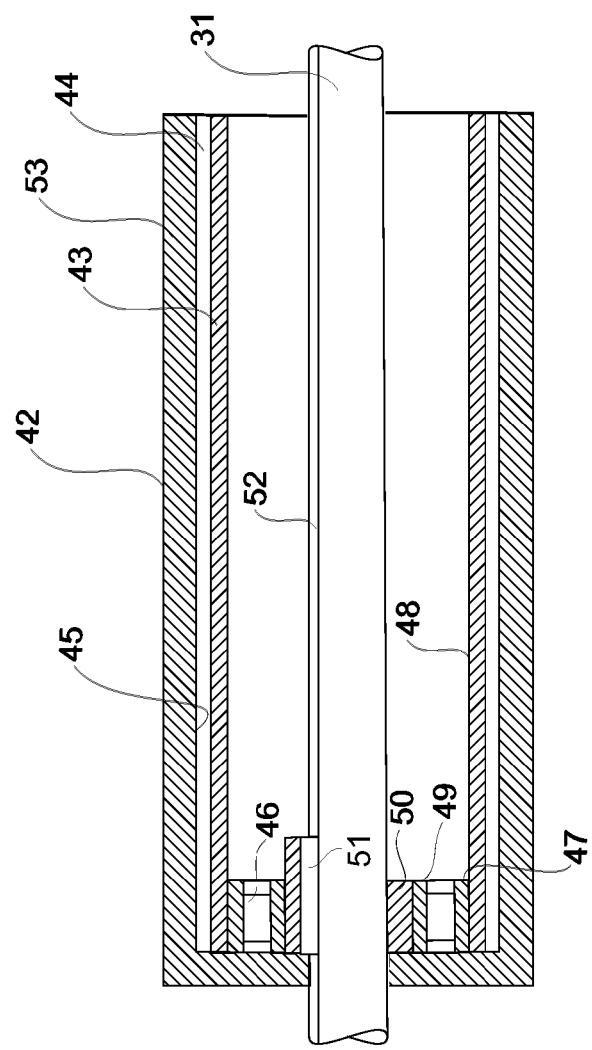
Fig. 11
Fig. 12

MOULDING ARRANGEMENT AND A METHOD FOR PRODUCING AN ARTICLE USING THE MOULDING ARRANGEMENT

CROSS-REFERENCE TO RELATED APPLICATIONS

This application is a 371 filing of International Patent Application PCT/EP2012/067342 filed Sep. 5, 2012, which claims the benefit of European patent application no. 11180068.6 filed Sep. 5, 2011.

BACKGROUND

The invention relates to a moulding arrangement for an injection-moulding machine,
- the injection moulding arrangement is configured for moulding at least one article composed of components of at least two different materials,
- the injection moulding arrangement comprises an injection mould having a movable mould half and a stationary mould half, which mould halves in a closed position of the injection mould define at least two cavities for injecting the different materials for the respective components moulded at each stroke of an injection-moulding machine,
- in the closed position of the injection mould the at least two cavities correspond to the shape of one or more of the components of the at least one article,
- the at least two cavities are arranged at angular distance from each other,
- the at least two cavities are arranged at equal distances from a central axis of the injection mould,
- parts of the at least two cavities are formed in a separately movable section of the movable mould half of the injection mould, and
- the injection moulding arrangement comprises an operation part for in an open position of the injection mould displacing said separately movable section to-and-fro between an extended position and a non-extended position.

The invention also relates to a method for by means of the injection moulding arrangement producing articles composed of components made of different materials.

Within the context of the present invention the term "different materials" includes materials, which have the same or different physical properties, chemical properties and/or different colours. These materials can e.g. be a plastic material, such as a thermoplastic polymer. So two materials with different or same properties can be combined into articles with delicate and complicated structures, however moulding complicated articles of one of the same material but requiring several separate moulding steps to achieve the finished article are also foreseen within the scope of the present invention.

In some cases the design of an article requires that the article have more different colours. In other cases an article is made of two or more materials to improve any or all of e.g. usability, user friendliness, quality, property, functionality, and aesthetics of the article. One of the materials can for example be abrasion-proofed, antislip or rubbery, to respectively confer abrasion resistance, antislip or friction properties to the final article. At the same time any of the included material can have another colour than the other materials.

An injection mould usually consists of a movable mould half and a stationary mould half. The movable mould half is directly or indirectly fastened to a movable clamping plate of an injection-moulding machine. The stationary mould half is directly or indirectly fastened to a stationary clamping plate of the injection-moulding machine.

Cavities of opposite mould halves together define the shape of the articles to be moulded in the closed mould. These cavities are typically machined in plates.

In a known method for e.g. producing an article of two components made of each their material a first component is moulded in a first cavity of a mould clamped in an injection-moulding machine. Then the first component manually or by means of a robot is transferred to a second cavity of the injection mould where the second material is injected onto or at the first component in a second operation cycle.

Carrying out this method for producing articles of more components made of different materials is however costly and time-consuming. Moreover this method requires relatively large investments in machinery and tools.

An attempt to overcome these problems is known from the patent specification GB 1 392 074 describing a method for in one operation cycle producing an article consisting of two components made of each their material in one mould. One side of the surface of the stationary mould half is formed with cavity halves for a number of first components while the other side of the surface symmetrically is formed with cavity halves for the same number of finished articles whereby the movable mould halves is equipped with corresponding mould cores. A transporting plate, which is both axially and turnable displaceable by means of a drive shaft, is placed between the two mould halves. The transporting plate is formed with bores for allowing the cores to enter the respective cavities in the stationary mould half during a shot. Opening the injection mould and retracting the cores from the transporting plate and the transporting plate from the stationary mould results in that the finished articles are falling out of their cavity halves in the stationary mould half while the injection moulded first components are pulled out of their cavities by being adhered to the transporting plate. The transporting plate is then turned 180° whereby the injection moulded first components are brought into position in front of the cavities for the finished articles. When being closed the injection mould is ready again for moulding a number of both first components and finished articles.

This known injection mould arrangement suffer however of the serious drawback of being limited to be used for only moulding cup-formed articles, since this know arrangement cannot function without such cores. Moreover, the transverse extension of the transporting plate is relatively large since said extension mainly corresponds to the extension of the injection mould. The transporting plate therefore has a relatively large moment of inertia, which implies that the time for turning the transporting plate for each operation cycle needs to be relatively large, and the production capacity therefore corresponding little. The arrangement can moreover hardly be converted to produce different products, at least only by replacing large parts of the arrangement. Moreover, the functioning of the mechanism for axially displacing and turning the transporting plate is both complicated and unsteady, especially because the injection moulded first components do not adhere securely to the transporting plate during the retracing and turning operation of this transporting plate.

From German patent document DE 4 243 293 is known a corresponding injection moulding arrangement which however suffers from substantially the same disadvantages and drawbacks as mentioned above in relation to the injection moulding method of GB 1 392 074.

DE 4 243 293 relates to a moulding arrangement of the kind having an injection mould for manufacturing plastic toothbrush brushes. The injection mould comprises a stationary and fixed mould plate, an opposite moveable ejector mould plate and a rotary part together defining three angularly displaced moulding positions for injection of three different plastic materials in three angularly displaced substantially identical moulding cavities. In each position an injection unit injects a respective liquid molten plastic material through a sprue bushing via a channel and a nozzle into the respective mould cavities putting additional layers around the tooth brush. The rotary part holds the head part of the toothbrush brushes when the moveable plate and the stationary plate are moved apart so that the toothbrushes can be rotated to a next injection position by means of the shaft of the rotary part or be cooled and ejected at the end of the injection operation cycle. The rotary part has arms with pins extending into slots in the elongate toothbrush body to hold this body stiff during rotation when the injection mould plates are spaced apart. If no pins were provided, the toothbrushes would bend or even drop to the bottom of the injection moulding arrangement during rotation of the rotary part. The pins leave holes in the toothbrush. Such holes are undesired and not possible to include in many other moulded articles. So this known moulding arrangement is not intended nor suited for moulding other objects than simple toothbrushes. Adding extra parts to a basic body of more complex structure is not foreseen.

A further major disadvantage consist in that injection takes place from the stationary mould plate directly onto the tooth brush shaft in each moulding step, which inevitable leaves disfiguring moulding residues, such as moulding fins, moulding flashes, moulding burs or moulding seams, protruding from the tooth brush towards the stationary moulding plate thus being a potential obstacle for the subsequent moulding step. Such moulding residues can be in the way when turning a half-finished moulded toothbrush to its next moulding position, and the injection moulding plates need a substantial clearance from each other to allow the rotary part to rotate. Moreover, when the injection moulding plates are joined again for adding an extra layer around the toothbrush's elongate shaft that protrudes from the rotary part the next moulding cavity is not able to take the residue made in the earlier moulding step into account.

SUMMARY OF THE INVENTION

The above-mentioned disadvantages of the prior art moulding arrangements for injection moulding articles of different materials are according to the present invention remedied by,
in a first aspect of the invention providing a moulding arrangement of the kind mentioned in the opening paragraph which is versatile and can be reconfigured to mould a multiplicity of multicomponent articles,
in a second aspect of the invention providing a moulding arrangement of the kind mentioned in the opening paragraph by means of which articles of different materials can be moulded within one single operation cycle,
in a third aspect of the invention providing a moulding arrangement of the kind mentioned in the opening paragraph, which quickly and easily can be converted to produce articles of different kinds,
in a fourth aspect of the invention providing a moulding arrangement of the kind mentioned in the opening paragraph which has a large production capacity,
in a fifth aspect of the invention providing a moulding arrangement of the kind mentioned in the opening paragraph which functions steady and consistent,
in a sixth aspect of the invention providing a moulding arrangement of the kind mentioned in the opening paragraph which has a simple and inexpensive structure,
in a seventh aspect of the invention providing a moulding arrangement of the kind mentioned in the opening paragraph in which surplus of injection material can be collected and reused,
in an eight aspect of the invention providing a moulding arrangement of the kind mentioned in the opening paragraph in which sprue formation are reduced and does not compromise production rate and quality,
in a ninth aspect of the invention providing a moulding arrangement of the kind mentioned in the opening paragraph which can be reconfigured for moulding other article using the same basic machinery, and
in a tenth aspect providing a method for producing an article composed of components made of different materials by means of the injection moulding arrangement mentioned in the opening paragraph.

The novel and unique features of the invention whereby these and other aspects are solved consist in the fact that
in the open position of the injection mould turning the separately movable section about said central axis an angle corresponding to the angular distance between the at least two cavities so that
in the closed position of the injection mould the parts of the at least two cavities in the movabel section together with cavity halves in the remainder of the movable mould half and in the stationary mould half form the at least two cavities.

Thereby is obtained a moulding arrangement, which advantageously has both a simple and inexpensive structure and a large production capacity too. The injection moulding arrangement is capable of being used to produce different articles made of different materials in one single cycle.

The angular arrangement of the different moulding cavities enables the manufacturing of a single article composed of more than one sub-component. Not only can layers be added to the article step by step in each angular position so can additional parts of the article just by closing the injection mould, performing the injection of a first moulding material for a first component, opening the injection mould and displacing the first component from its moulding cavity, angularly displacing the first component by turning the moveable section to the next moulding position, closing the injection mould again and adding the next part or component to the first component. These steps are repeated until the article is finished and the injection mould can have as many moulding cavities as required and possible by way of available areas for making spaced apart moulding cavities.

It is important that angular distance between different moulding cavities and distance between cavities and central axis of the injection are carefully calculated and adjusted so that each component are added to the previous at the correct place to make the final and finished article. Also the size of the cavities are selected in dependency of the chosen material taking e.g. shrinking of the component made in a first moulding cavity into account in the next moulding cavity where a further component is added to the first component.

Advantageously injection of material into at least one of the at least two cavities can be made via the separately movable section.

Because the injection of moulding material takes place from the moveable part the risk is eliminated that a sprue, that is made in a first or any subsequent moulding step, protrudes inexpediently into the gap between mould halves when operating the moveable section. Any impact of a sprue on the final shape of the article is expediently avoided by the present invention and sprues are not in the way when turning the moveable section nor will sprues confer impact on the visual design of the final article.

According to the invention the separately movable section of the movable mould half can be formed as a movable carrier for a support member, which releasably can be attached to the carrier, and during an operation cycle can support the injection moulded components and the articles.

Since the carrier only holds the support member and not the injection moulded components an article on the carrier can have a little transverse extension and therefore a little moment of inertia. That implies that the carrier quickly can be turned an angle corresponding to the angle between the cavities whereby the injection moulding arrangement obtains a high production capacity.

As mentioned above the injection moulding arrangement according to the present invention is very beneficial when manufacturing articles composed of more than one component.

The injection moulding arrangement can for example be used to manufacture an article composed of at least one first component made of a first material and at least one second component made of a second material. In such an embodiment of the injection moulding arrangement the injection mould can be formed with
  a first cavity for moulding a first integral unit consisting of the at least first component and the support member, and
  a second cavity for moulding a second integral unit consisting of the first integral unit and the at least second component so that the supporting function of the support member automatically becomes a part of the injection moulding process.

Often a quantity of material in form of required sprues extending from the article is moulded integrally with said moulded articles. Said sprues are normally severed from the respective articles in a subsequent operation upon removal of the article from the injection mould.

The operation cycle of the injection moulding arrangement according to the invention does however not allow such operation since the article to be moulded in form of the first integral unit and/or second integral unit are not removed from the injection mould directly after having been moulded. Instead the first or second integral unit are turned simultaneously with the turning of the carrier holding the injection moulded articles and/or components during the injection moulding operation. The turning of the carrier requires the injection mould to be opened sufficiently to allow a sprue and the injection moulded component to perform such turning operation together with the injection moulded articles.

When opening the injection mould any conventional sprue and moulded component need to be pulled out of the respective moulding material injection inlet as well as of the injection moulding cavities by means of a drawing power. Said drawing power could, if occasion should arise, pull the support member of the article free of its releasable attachment to the movable carrier so that the support member with the accompanying article simply would get stuck in the fixed half of the injection mould so that the production of articles could not be carried out. Thus drawing power should be carefully controlled. Conveniently the releasable attachment of the support member to the movable carrier can be stronger than the releasable attachment of the injection moulded component to facilitate component detachment in favour of accidental detachment of support member.

The sprue in form of the support member exists already as an important part of the injection moulding arrangement according to the invention. This kind of sprue does not constitute and obstruction for carrying out the operation cycle of the injection moulding arrangement contrary to sprues of the kind, which are moulded in inlets in a stationary mould half and require additional work and thereby costs for forming sprue accommodating holes in the stationary mould, hole that are adapted to contain the out-sticking sprues in a further moulding step. Thereby is advantageously obtained that it is the support member only, which functions as sprue for the article to be moulded and not any other sprues sticking out. By using injection nozzles, which are arranged for injecting the injection moulding materials directly into the respective angularly displaced cavities of the injection mould the problem of unnecessary formation of sprues and spatially obstruction of sprues formed during the injection moulding process are eliminated.

Conveniently at least one of a first injection nozzle and a second injection nozzle are arranged for injecting the at least one material, e.g. the first material or the second material, respectively, directly into that part of the respective cavities which corresponds to the shape of the support member. So an article can be moulded in two steps, where a first component of the article together with a support member are moulded in the first cavity and a second component is added by moulding to the first component in the next second cavity reach by means of the moveable section.

Thereby is advantageously obtained that it is the support member, which serves the main function as a common sprue for holding the article to be turned into the different angularly displaced moulding positions and moulding cavities.

In summary, the support member serves as the carrying sprue for the article during the complete moulding process. So the support member is made already in the first moulding step and is an important part of the injection moulding arrangement according to the invention. The support member does not constitute an obstruction for carrying out the operation cycle of the injection moulding arrangement contrary to sprues of the kind, which are moulded in inlets in the stationary mould half and protrude inside the gap between the injection mould parts and require additional work and thereby costs for forming many different sprue-accommodating holes in the stationary mould part.

Another advantage obtained by using the support member of the invention as the carrying sprue consists in the fact that the ugly marks which the nozzle will leave on the injection moulded integrals units are left on the support member. This support member is not part of the finished article. The support member is cut off and rejected, so that the finished articles are kept completely free from such disfiguring marks.

At least the first injection nozzle can conveniently be situated for injection into the cavity for moulding the support member and not into the cavity for moulding the first component. The support member carries the first component while being turned to mould the second component, thus serving as a common, which however not need to be ejected, nor need new accommodation, nor need repositioning in order to perform a further moulding step after having been turn. The first component will is free from obstructions or other moulding defects due to sprues having been inadequately removed, e.g. too much or too little material has been removed. The interface between the first component and the second component can therefore be well-defined, not too deep or not too high. E.g there is no risk that an extension from the first component due to a sprue penetrates or deforms the second component or that an unintentional indent is made due to excessive sprue removal. So contrary to prior art arrangements, the arrangement according to the present invention can add just a very thin layer, part or coat to a section of a moulded component, making high-quality article at fast speed. The invention thus is particularly suited to add extra thin layers on selected areas of the exterior surface of the first component.

According to the invention the nozzles for injecting the material directly into the cavities of the injection mould can advantageously be a heat runner with a valve needle and a heating arrangement for keeping the materials sufficiently liquefied, plasticized and/or soft. Thereby is effectively achieved that material effectively can be injected to flow and run into the injection mould cavities to fill these cavities. The valve needle can be securely opened and closed so that material and thus costs are saved.

According to the invention the support member can in a final step of the production be severed from the article, which then can be ejected from the injection mould.

The operation part of the injection moulding arrangement can in a preferred embodiment according to the invention comprise an axially displaceable ejector plate with ejector pins for in the open position of the injection mould ejecting the first and second moulded integral unit from the movable mould half without at the same time ejecting the support members from the carrier.

Thereby is advantageously obtained that the support member still are able to displace and turn the integral units in the open position of the injection mould.

In a preferred embodiment according to the invention the operation part of the injection moulding arrangement can comprise an axially displaceable drive shaft, which is connected to the carrier and is adapted to displace the carrier in the open position of the injection mould so far towards the stationary mould half that the carrier can bring the integral units beyond the reach of the ejector pins in which position the ejector pins freely can be turned by the carrier.

The operation part can, according to the invention, include turning means, which is able to turn the carrier stepwise into angles corresponding to the angles between the cavities in the injection mould either only clockwise or only counter clockwise.

Such turning means can in one embodiment of the invention be a ratchet mechanism disposed on the drive shaft or on the carrier on the drive shaft. In a preferred embodiment according to the invention the operating part is adapted with turning means in form of a gearwheel rim mounted on the drive shaft and a toothed bar meshing with the gearwheel rim. Said gearwheel rim can according to the invention be mounted on the drive shaft via a free wheeling hub adapted to allow the gearwheel rim to turn the drive shaft only clockwise or counter clockwise thereby maintaining control of the operation and not accidentally actuate a reverse moulding operation which could result in e.g. an exterior component being moulded before the main body to which this exterior component should be added.

In an especially expedient embodiment according to the invention the free wheeling hub can be a free wheeling roller bearing, which is marketed by the German company, Stieber Germany under the designation, CSK20-P-2RS-C6 SF. Said free wheeling roller bearing advantageously allows the drive shaft with the carrier to be nearly frictionless turned repeatingly.

According to the invention the operation part may comprise a sleeve, which functions as a bearing application for the gearwheel rim, which turnably is placed in said sleeve with the teeth of the gearwheel rim slidingly abutting the inner surface of the sleeve.

For allowing the toothed bar to mesh with the gearwheel rim a transverse opening can according to the invention be provided in the wall of the sleeve. The transverse opening can e.g. be made by cutting.

For being able to mould the satisfactory high-quality article in accordance with the present invention it is necessary that the cavity halves of the movable mould halves and the carrier fit precisely to the corresponding cavity halves of the stationary mould half in the closed position of the injection mould. Thus any angular displacement error or axial gap or other misalignment between these parts must be avoided.

To that aspect, in order to ensure that the carrier is turned precisely the predetermined angle between neighbouring cavities in the injection mould each time, the operation part can be adapted to turn the carrier less than said angle and the remainder of the turning operation can be performed by means of at least one conical tap which is mounted upon the stationary mould part and is fitting into a corresponding recess formed in the carrier in the closed position of the injection mould. The conical tap then serves as a guide tap for correct orientation of the injection mould halves each time said mould halves are closed after having being opened and the currently moulded article has been turned to the next position.

The invention also relates to a method for producing an article composed of a first and a second component made of same or different materials by means of the injection moulding arrangement according to the invention.

The method comprises the steps of in each operation cycle,
 injecting the material into the at least two cavities of the closed injection mould via the separately movable section,
 opening the injection mould,
 ejecting a first and second integral unit from the movable mould half without ejecting a support member from the carrier,
 displacing the carrier a distance further than ejector pins of an axially displaceable ejector plate,
 turning the carrier at least a part of an angle corresponding to the angle between neighbouring cavities in the injection mould,
 closing the injection mould, and
 ejecting the support member from the injection mould during closing of the injection mould.

This inventive method according to the invention may comprise any of the additional steps including but not limited to the steps of moulding of the first integral unit, moulding of the second integral unit, severing of the article from the second integral unit during closing the injection mould and ejecting of the support member from the injection mould. All steps take place simultaneously during each operation cycle. Thereby is advantageously obtained a high production output in an operation cycle that is easy and secure to perform.

A further option is to retract ejector pins of the axially displaceable ejector plate away from the carrier.

In a preferred embodiment material is injected directly into the respective cavities of the injection mould, optionally material is partly injected directly into that part of the respective cavities of the injection mould, which corresponds to the shape of the support member.

BRIEF DESCRIPTION OF THE DRAWINGS

The invention will be explained in greater detail below, giving further advantageous features and technical effects and describing exemplary embodiments with reference to principle sketches illustrating the structure of the injection moulding arrangement and a series of perspective figures illustrating the method steps when using the injection moulding arrangement.

FIG. 7 is a horizontal cross section of the closed mould, FIG. 8 is a vertical cross section of the closed mould, FIG. 9 is a longitudinal cross section of an operation part of the injection moulding arrangement according to the invention, FIG. 10 is a cross section taken along the line X-X in FIG. 9, FIG. 11 shows in a larger scale a longitudinal section of a detail of the operation part, FIG. 12 is a fragmentary view of a cross section of the detail seen in FIG. 11.

DETAILED DESCRIPTION OF THE INVENTION

The article to be produced by means of the injection moulding arrangement according to the invention may be composed of more components made of each their material or be of the same material. In the following description it is assumed that the article is composed of two components and that the material is a thermoplastic plastic, which is in a heated to liquid, flowing or plasticized state. This material is injected into the cavities of the injection mould. This assumption and the exemplary embodiment should not in anyway be considered limiting the scope of the appended claims. Although the detailed explanation of the invention discusses an article made of just two components the injection moulding apparatus can easily be used for moulding articles consisting of more than two components.

FIGS. 1-17 illustrates the injection moulding arrangement by way of principle sketches while FIGS. 18-27 serve to illustrate the method step of moulding a complex article by means of a series of schematic perspective figures.

Figure 1:
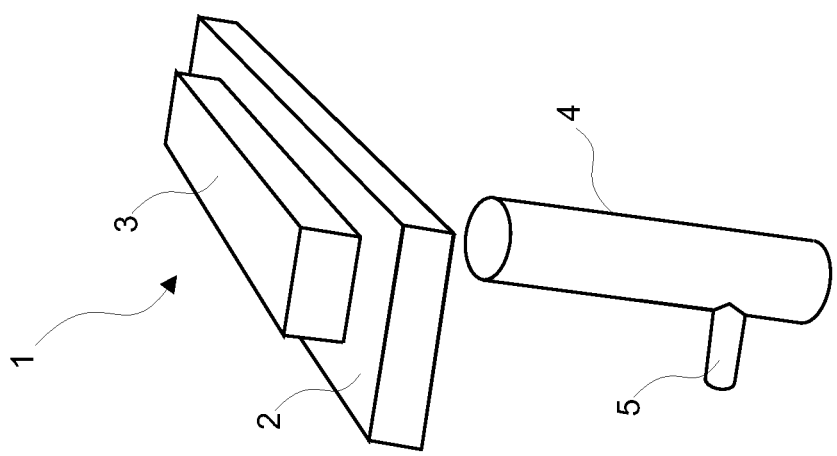
FIG. 1 shows in perspective a simple article to be produced by means of the injection moulding arrangement according to the invention and a support member for supporting the injection moulded components and articles during the steps of the injection moulding process.

The article, which in FIG. 1 is denoted the reference numeral 1, is composed of a first component 2 and a second component 3. For explanatory purposes the components are each formed as a simple block with rectangular surfaces. Within the scope of the invention the components can however have any desired shape as will be clear with reference to FIGS. 18-29.

The article 1 and the support member 4 are for illustrative reasons shown as separate parts in FIG. 1.

The support member 4 is for illustrative purposes just formed as a cylinder with a lower anchor pin 5, however the support member can within the scope of the invention have any other shape, e.g. be formed with a cross section like a rectangle or have a branched shape. Within the scope of the invention the support member 4 can also be equipped with more than one anchor pin 5, and anchor pins can have any convenient and appropriate form.

The support member 4 serves for supporting the integral units during an operation cycle of the injection moulding arrangement in a way, which will be explained more specifically later together with the function of the anchor pin.

During an injection operation a first integral unit 6 consisting of the first component 2 and the support member 4 is moulded in a first station of the injection mould; in a second station of the injection mould a second integral unit 7 consisting of the first integral unit and the second component 3 is moulded; the second integral unit 7 is severed into the support member 4 and the article 1 at a third station of the injection mould, which article 1 thus is enabled to leave the injection mould; and in a fourth station of the injection mould the support member 4 is ejected from the injection mould.

Figure 3:
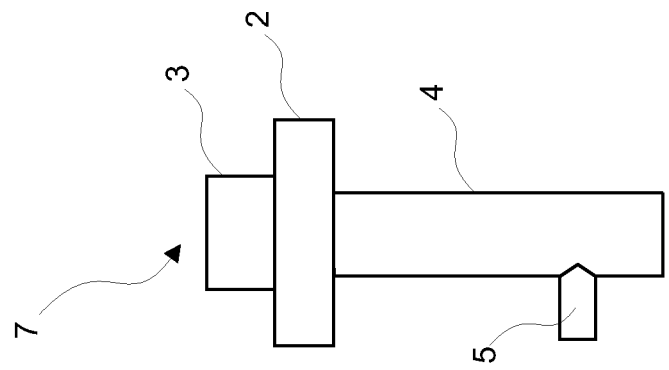
FIG. 3 is lateral view of another integral unit consisting of both the first integral unit and the support member seen in FIG. 1.
Figure 2:
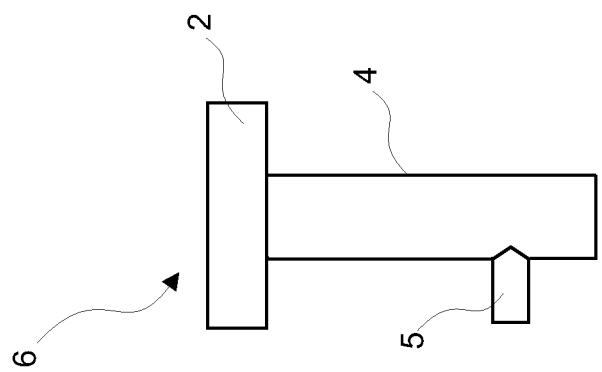
FIG. 2 is a lateral view of an integral unit consisting of a simple first component of the article being moulded and the support member seen in FIG. 1.

The first integral unit 6 is shown in FIG. 2 and the second integral unit 7 in FIG. 3.

Figure 5:
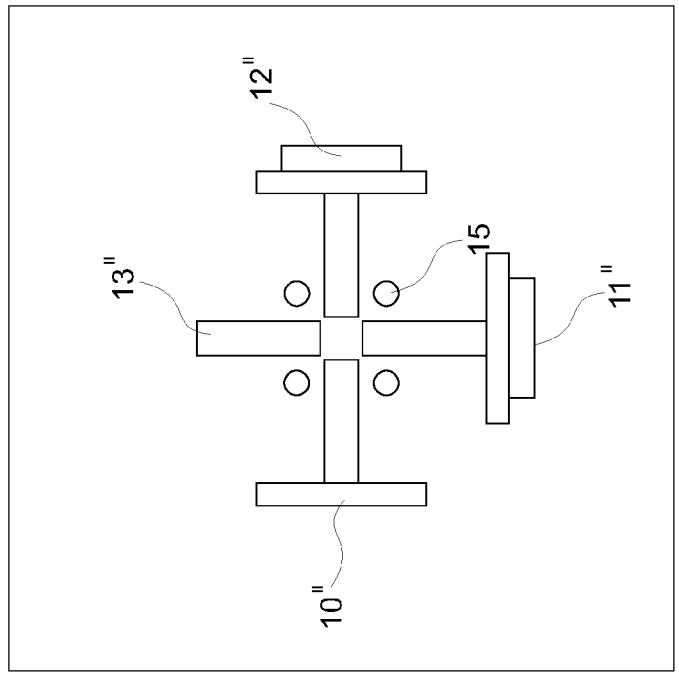
FIG. 5 shows, seen from the front, the stationary mould half of the injection mould for moulding the article seen in FIG. 1.
Figure 4:
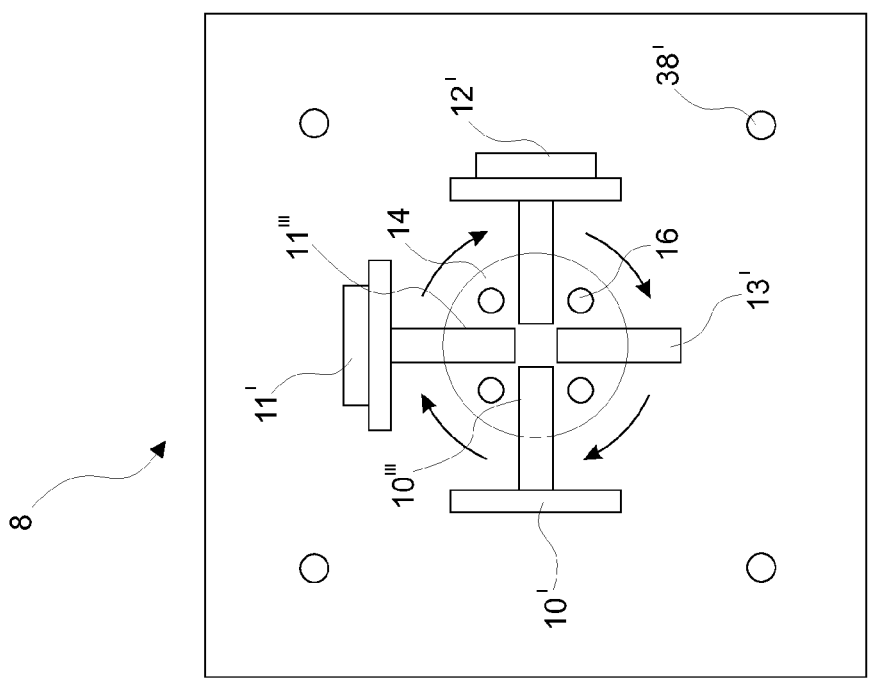
FIG. 4 shows, seen from the front, the movable mould half of an injection mould for moulding the article seen in FIG. 1.

FIG. 4 shows, seen from the front, the movable mould half 8 of an injection mould (not seen), and FIG. 5 shows the stationary mould half 9 of the injection mould.

Cavity halves 10' and 10" are machined in the surface of the movable and stationary mould halves 8 and 9, respectively, thereby forming a cavity 10 for moulding the first integral unit 6, as seen in FIG. 2, in the closed injection mould 8,9, as seen in FIG. 7.

Other cavity halves 11' and 11" are machined in the surface of the injection mould halves 8 and 9, respectively for in the closed injection mould 8,9, as seen in FIG. 8, forming a cavity 11 for moulding the second integral unit 7, as seen in FIG. 3.

Cavity halves 12' and 12" are machined in the surface of the injection mould halves 8 and 9, respectively, for in the closed injection mould 8,9, as seen in FIG. 7, forming a cavity for temporary holding the second integral unit 7 while it is being severed into article 1 and support member 4.

Cavity halves 13' and 13" are machined in the surface of the injection mould halves 8 and 9, respectively, for in the closed mould 8,9, as seen in FIG. 8, forming a cavity for temporary holding the support member 4 until it finally is ejected from the injection mould.

A central section of the movable mould half 8 is formed as a separately movable carrier 14 for releasably holding the support member 4. In the open position of the injection mould, the carrier 14 is adapted to be turned at selected angles, as indicated by the arrows. In this case the angle is as an example 90°. Turning serves to move the support members with the integral units from one cavity of the injection mould to the next cavity to add a further component.

The two mould halves need to be lined precisely up in relation to each other in the closed position of the injection mould so that the cavity halves fit precisely to each other. Correct and accurately formed articles are safely moulded at each stroke of the injection-moulding machine.

To ensure that the cavity halves fit precisely to each other in the closed position of the injection mould the stationary mould half 9 is in the current case equipped with four conical taps co-operating with opposite recesses 16 in the stationary mould half 8.

Figure 6:
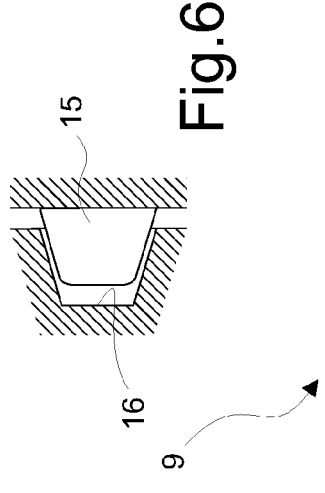
FIG. 6 is a fragmentary view of a longitudinal section of a conical tap formed on the stationary mould half and cooperating with a recess formed in the movable mould half for aligning the two mould halves in relation to each other when closing the injection mould.

The conical surfaces of the taps 15 and the recesses 16, which are shown fragmentarily in the larger scale view of FIG. 6, abut each other in the closed position of the injection mould whereby the mutual angle position of the two mould halves always need to be the same as the predetermined angle position. In FIG. 4 the reference numeral 38' denotes through-bores for returning rods 38, the function of which will be explained later with reference to FIGS. 9-17 of the drawing.

FIGS. 7 and 8 show the closed mould 8,9 in operative state and FIG. 7 is a horizontal cross section of the injection mould and FIG. 8 a vertical cross section of the injection mould.

FIG. 7 shows a first injection nozzle or heat runner 17 for injecting the first material directly into that part of the first cavity 10 which corresponds to the shape of the support member 4, and FIG. 8 shows a second injection nozzle or heat runner 18 for injecting the second material directly into that part of the second cavity 11 which similarly corresponds to the shape of the support member 4.

Thereby is advantageously obtained that it is the support member 4 only, which functions as sprue for the first integral unit 6 of the article 1 to be moulded. The first integral unit 6 of the article 1 is not given any separate sprues, which in fact would act as obstructions for performing the very particular operation cycle of the invention. So the second component 3 can be added to the first integral unit 6 by moulding, where the interface between the first component 2 and the second component 3 is free from obstructions or other defects. The interface between the first component 2 and the second component 3 is therefore well defined and there is no risk that an extension from the first component 2 due to a sprue penetrates the second component 3 if the second component 3 is a thin layer.

During closing of the injection mould the second integral unit 7 in the cavity 12 of the injection mould is severed into the article 1 and the support member 4 by means of a knife 19 on the movable mould half 8 co-operating with a cutting edge 20 on the stationary mould half 8. After severing, the article 1 falls out of the injection mould via a first vertical channel 21 formed in and delimited by the injection mould.

The above-mentioned operations all take place simultaneously in the closed position of the injection mould.

After opening of the injection mould the carrier is, as previously mentioned, turned 90°, whereby the severed support member 4 is turned to the position of the cavity 13' in the movable mould half of the injection mould.

During closing of the injection mould again for starting a new operation cycle the support member 4 is, as seen in FIG. 8, ejected from the carrier by means of an ejector pin 22, which is fastened to the movable mould half after which the released support member 4 falls out of the closed mould via a second vertical channel 23.

The carrier is formed as a conical disc 14 which fits into a corresponding conical recess in the movable mould half with a little distance to the bottom 24 of the recess. The conicities of the carrier and recess, respectively, secures that the carrier always will be lined correctly up in the movable mould half when closing the injection mould.

As seen in FIG. 7 a pin 25 on the bottom 24 of the recess secures that some of the first material for moulding the first integral unit 6 doesn't run out into the space between the bottom of the recess and the carrier via a bore 26 in the carrier during injecting of the first material into the cavity 10.

The movable mould half 8 is formed with ejector bores 27 and 29 for fragmentarily shown ejector pins 28 and 30 for ejecting the injection moulded integral units 6 and 7, respectively, from the movable mould half 8.

In the closed position of the injection mould the ejector pins are positioned in such a way that they block the injection moulding cavities thereby preventing that some of the injection materials run out into the ejector bores.

In FIGS. 7 and 8 is also seen a fraction of a drive shaft 31 for displacing and turning the carrier 14.

FIGS. 9 and 10 show an operation part 32, which comprises a rear plate 33 for clamping the unit to the movable plate, (not shown) of an injection-moulding machine, (not seen) and a front plate 34 for clamping the movable mould half 8 (not seen in FIG. 9) to the operation part.

The two plates 33 and 34 are interconnected with four bars 35 upon which an ejector plate 36 is mounted slidingly. The injector plate 36 can be moved forwards in relation to the front plate by means of hydraulic cylinders 37.

By engaging the stationary mould during closing of the injection mould returning rods 38 serve to push the ejector plate backwards after the hydraulic cylinders 37 have pushed the ejector plate 36 forwards in order to eject the injection moulded integral units by means of the ejector pins, (not seen in FIG. 9).

The front plate 34 of the operation part is formed with through-openings 39 for allowing ejector pins arranged in different groupings suited to and designated for different articles to pass the front plate without needing to make new bores in the front plate each time a new article is going to be produced.

The drive shaft 31 is displaced forwards and backwards in relation to the front plate 34 by means of a hydraulic cylinder 40. The drive shaft 31 is turned by means of a turning arrangement 41, which is shown in FIGS. 11 and 12 in a larger fragmentary scale view.

The turning arrangement comprises a tubular sleeve 42 and a gearwheel rim 43, which are placed turnable in the sleeve with its teeth 44 slidingly abutting the inner side 45 of the tubular sleeve.

The gearwheel rim is moreover connected to the drive shaft via a freewheeling hub adapted to allow the gearwheel rim to turn the drive shaft into one direction but not into the opposite direction.

In the current case the freewheeling hub comprises a freewheeling roller bearing 46 marketed by the German company, Stieber Germany under the designation, CSK20-P-2RS-C6 SF.

The freewheeling roller bearing 46 is fastened to the inner side 48 of the gearwheel rim 43 with its outer race 47, and is fastened with its inner race 49 to a muff 50 which again is coupled to the fragmentarily shown drive shaft 31 by means of a key 51 and slot 52 connection, which allows the drive shaft to be displaced axially but not to be turned in relation to the muff.

In the wall 53 of the tubular sleeve 42 is provided a transverse opening 54, which allows a toothed bar 55 to mesh with the gearwheel rim 43 in the sleeve. The transverse opening can e.g. be made by cutting.

The toothed bar 55 can be displaced up an down in a guideway 56, which is formed in the front plate 34 of the operation part of the injection moulding arrangement by means of a hydraulic cylinder 57. See FIG. 10.

The turning arrangement 41 of the invention functions in such a way that the gearwheel rim 43 is turned an angle each time the hydraulic cylinder 57 is displacing the toothed bar 55 a predetermined distance in one direction from a base position.

As previously mentioned it is important that the injection mould halves are lined precisely up in relation to each other and located precisely in the same mutual position each time the injection mould is closed so that identical articles of high quality is produced at all times.

The turning arrangement therefore doesn't turn the drive shaft fully 90° but for example only 89.5°. The remaining 0.5° is turned when the surface of the conical taps 15 on the stationary mould half 9 abuts the surface of the conical recesses 16 in the movable mould half or vice versa. See FIG. 6.

In this way it is effectively secured that the two mould halves including the carrier 14 always will be lined precisely up when the injection mould is closed.

That implies that the gearwheel rim turns the drive shaft, and thus the carrier, all 90° if said direction is the driving direction of the freewheeling roller bearing, since the gearwheel rim is coupled to the drive shaft via the freewheeling roller.

After having turned the gearwheel rim 43 in the sleeve 42, as explained above, the toothed bar 55 is withdrawn to its base position, but now without turning the drive shaft 31 because the returning direction is chosen as the freewheeling direction of the freewheeling roller.

Since the drive shaft slidingly is mounted in the turning arrangement the integral unit, which has been moulded in the previous operation cycle, will now be placed in the next cavity of the injection mould when closing the injection mould.

Within the scope of the invention the turning arrangement can also be formed in other ways.

Instead of the toothed bar for turning the gearwheel rim said gearwheel rim can be turned by a step motor, (not seen) with a pinion meshing with the gearwheel rim, and instead of the freewheeling roller bearing a ratchet mechanism can be used.

A step motor (not shown) or a revolving hydraulic cylinder (not shown) can advantageously also be used for directly or indirectly turning the drive shaft 31.

As can be understood by the person skilled in the art the operation part 32 is built in such a way that only few modifications, replacement and/or changes are required in order for using the moulding arrangement of the invention to produce articles of different structures and designs. Other plates with other mould cavities can easily be clamped to the injection-moulding machine in exchange for others to make different objects. In some cases e.g. just the plate clamped to the stationary platen needs to be exchanged.

Rearranging the injection moulding arrangement of the invention for producing a new article therefore quickly and easily can take place at minimum work performed and very low expenses for material for only the replaceable mould halves, the opposite mould plates. The carrier in which the support member are injection moulded are always the same and can be used for any mould parts fitting around the carrier in a manner that allows the injection material to flow from the carrier into the injection mould halves to stepwise mould integral units and thus the article, or different articles as occasion requires and defined by the selected mould halves.

FIGS. 13-17 illustrate the successive steps of an operation cycle performed by the injection moulding arrangement, here shown in a longitudinal vertical section.

The movable mould half 8 is now mounted upon the front plate 34 of the operation part 32 shown in FIGS. 9-12, and the stationary mould half 9 is mounted upon the stationary platen of an injection-moulding machine, (not seen) by means of a clamping plate 58.

Figure 13:
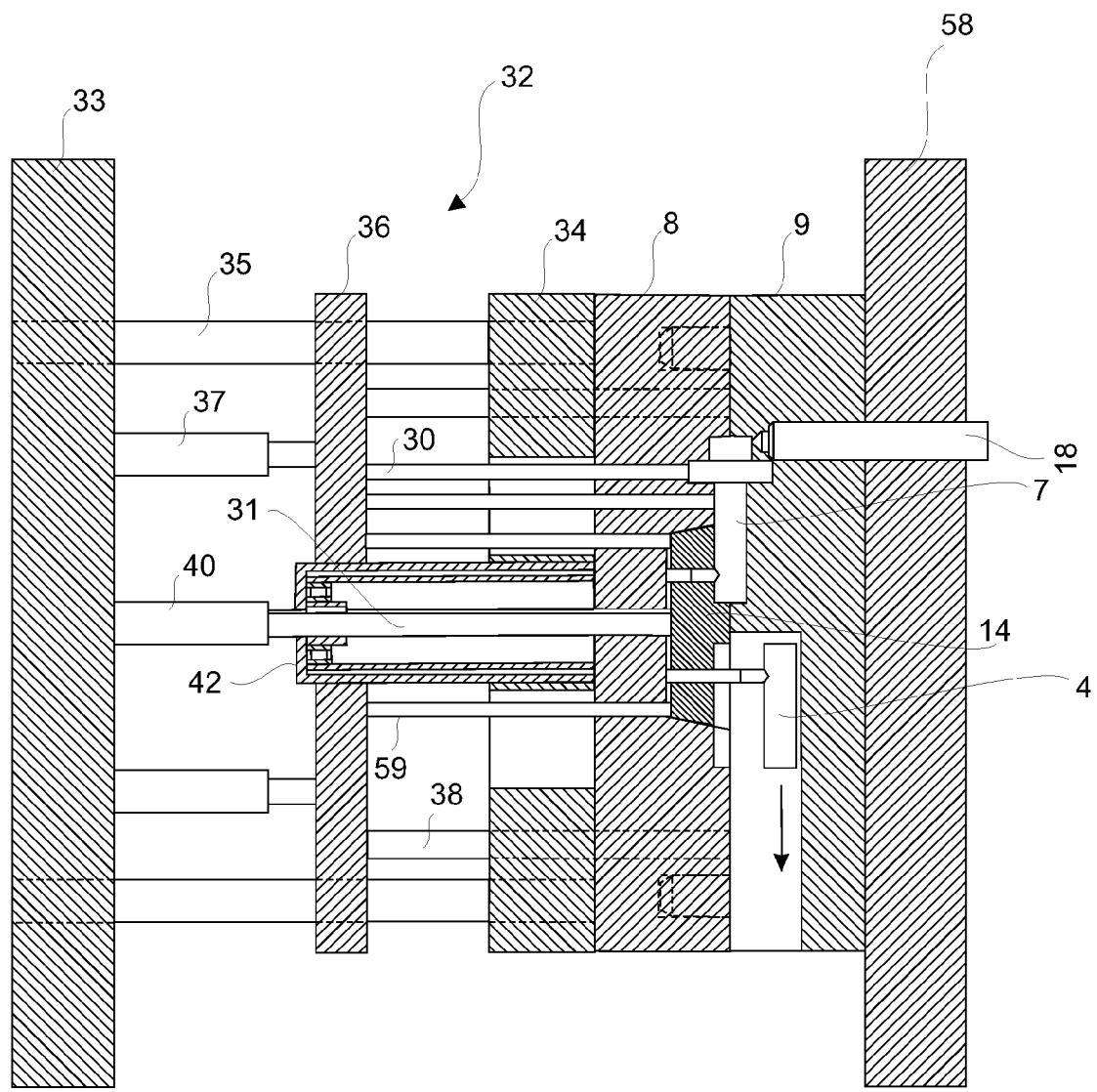
FIG. 13 shows a longitudinal vertical section of the injection moulding arrangement in the closed position of the injection mould.

In FIG. 13 the injection moulding arrangement is in its moulding mode. The operations, which take place when the injection moulding arrangement is in its moulding mode, are already discussed with reference to FIGS. 7 and 8.

Moulding of the first and second integral units 6 and 7 takes place while the injection mould 8,9 is closed.

However the separation of the second integral unit 7 into the finished article 1 and the support member 4, and the ejection of the support member from the injection mould, take place during closing of the injection mould.

Since FIG. 13 only shows a longitudinal section of the injection moulding arrangement only the second integral unit 7 and the ejected support member 4 is seen in moulded state.

The ejector pins 30 for ejecting the second integral unit 7 are extending all the way from this second integral unit 7 to the ejector plate 36, which has been pushed back to its rearward position during the closing of the injection mould by means of the engagement of the return rods 38 with the front of stationary platen 58.

The ejector pins 59 for ejecting the carrier during an ejector step are also seen.

Figure 14:
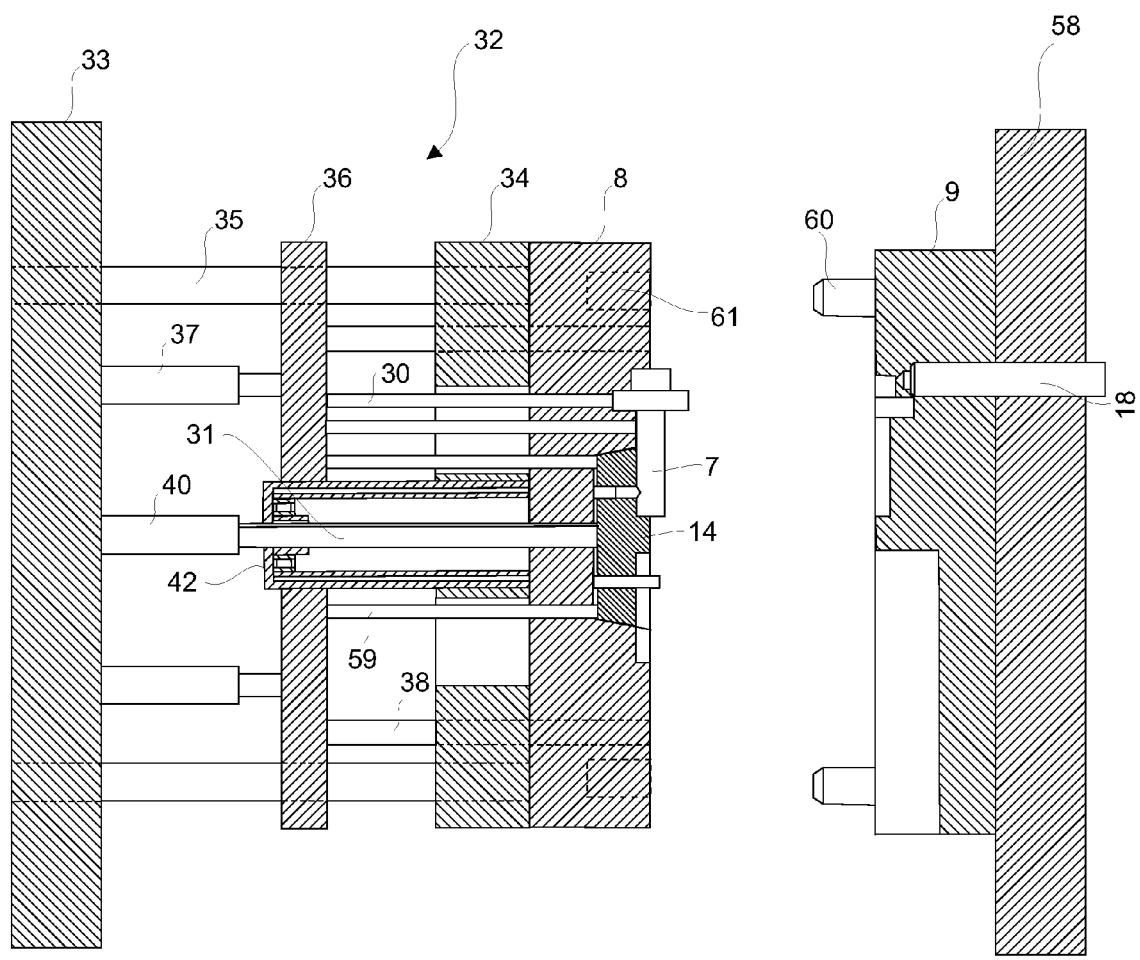
FIG. 14 shows a longitudinal vertical section of the injection moulding arrangement in the open position of the injection mould.

By retracting the movable platen of the injection-moulding machine, (not seen) the injection mould has, as seen in FIG. 14, been opened. The ejector plate 36 is still placed in its rearward position.

In FIG. 14 is also seen a guidance tap 60 on the stationary mould half 9 and a corresponding guidance recess 61 in the movable mould half 8.

The guidance tap and guidance recess engage each other when closing the injection mould and thereby serving for registering the injection mould halves securely in relation to each other.

Figure 15:
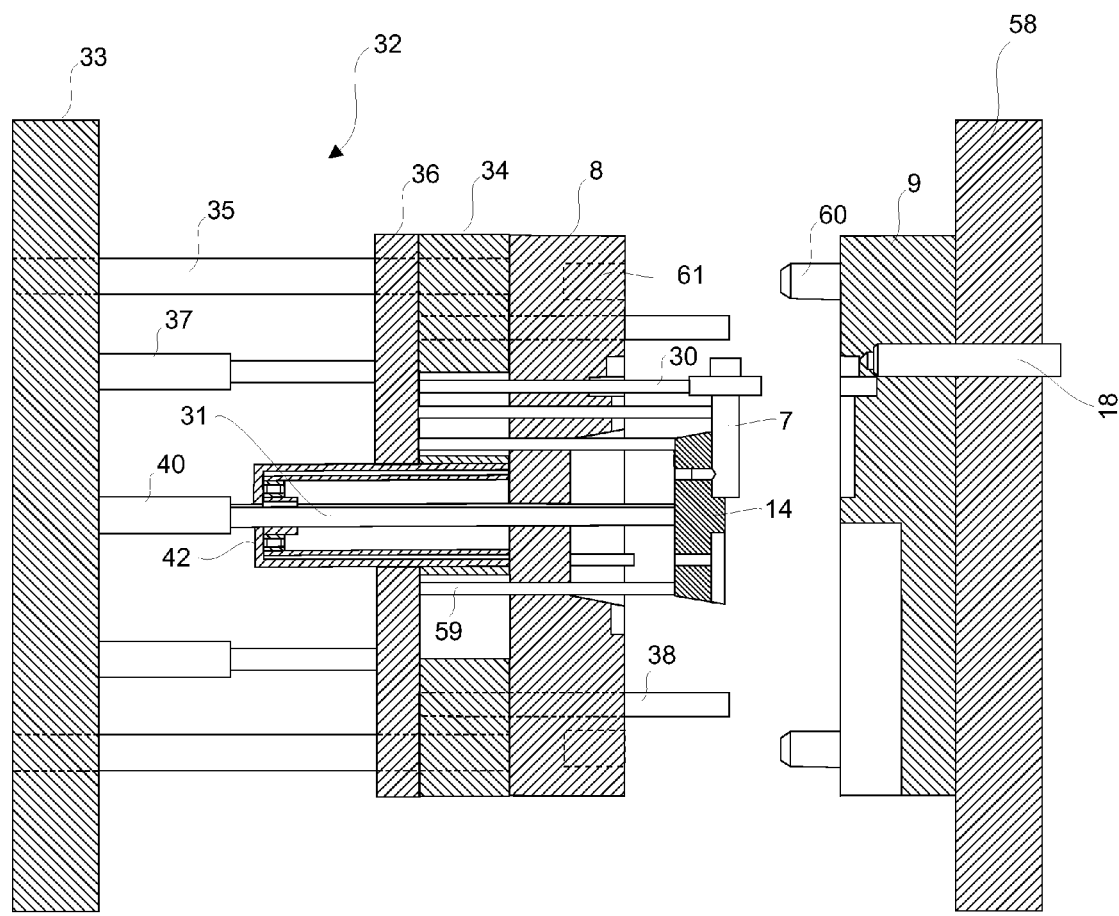
FIG. 15 shows a longitudinal vertical section of the injection moulding arrangement in the open position of the injection mould where the second integral unit and a carrier for holding the second integral unit has been ejected from the movable mould half by means of ejector pins.

In FIG. 15 the pneumatic cylinders 37 have pushed the ejector plate 36 forwards to its forward position whereby the ejector pins 30, seen in FIG. 8, and the ejector pins 28, seen in FIG. 7, have ejected the second integral unit 7 and the first integral unit 6 at the same time as the ejector pins 59 have ejected the carrier 14.

The first and second components 2 and 3 are now fully free of their respective cavities 10 and 11 so that only the support member 4 supports them in the shown ejected state.

The support member is however able to securely support and hold the components since the support member itself securely is attached to the carrier by means of the anchor pin 5 anchored in the bore 26 in the carrier 14. See also FIGS. 7 and 8.

The ejector pins are still touching the carrier and the integral units.

Figure 16:
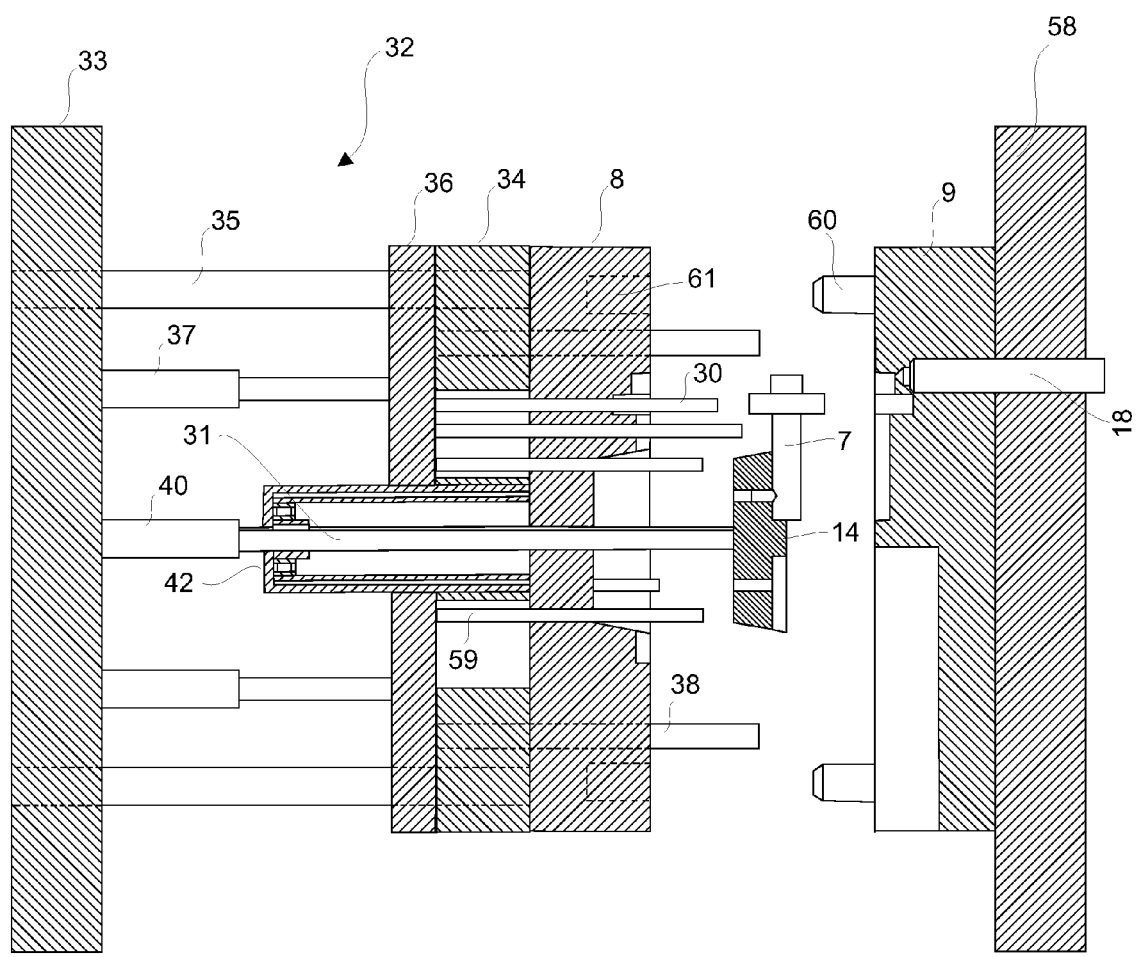
FIG. 16 shows the same but with the second integral unit displaced a further distance.

In FIG. 16 the hydraulic cylinder 40 has been activated whereby the drive shaft 31 has pushed the carrier 14 free of all ejector pins so that the carrier now can be turned freely.

Figure 17:
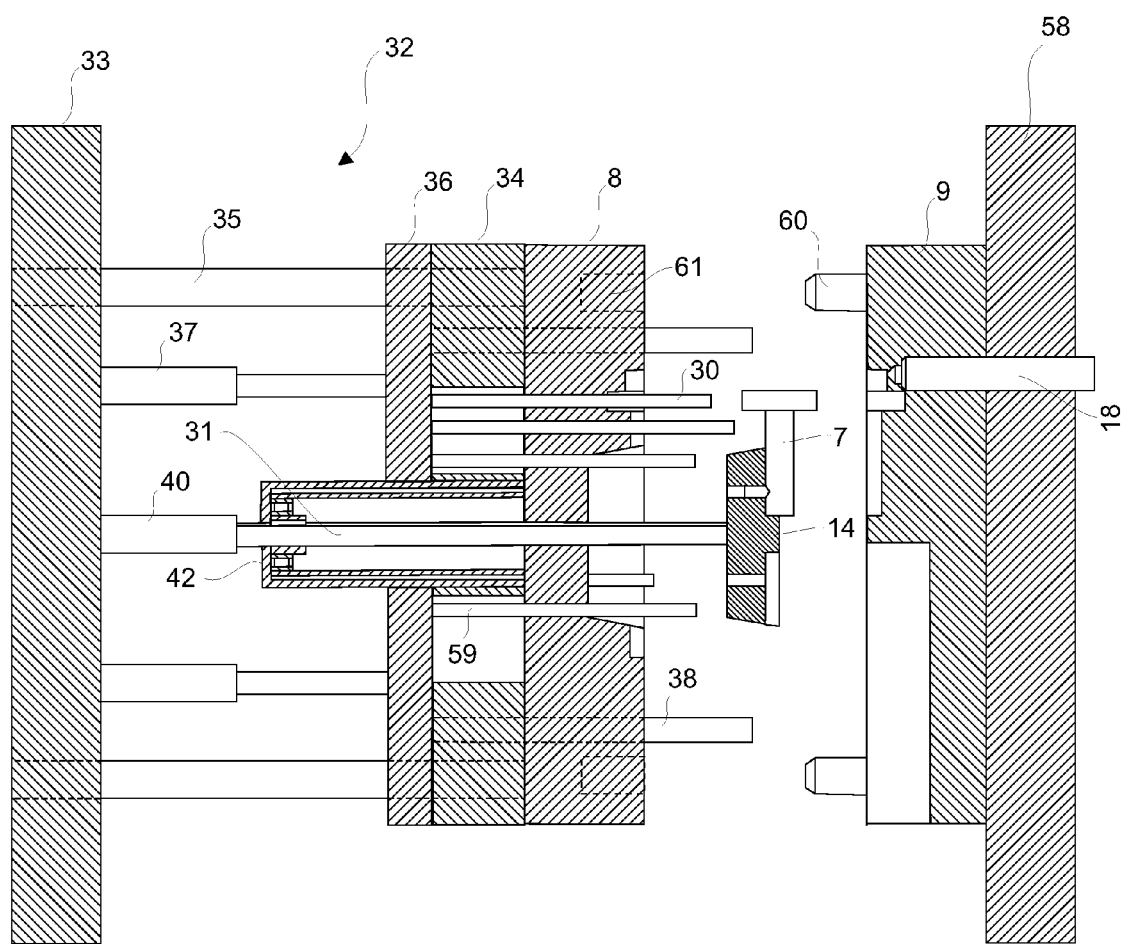
FIG. 17 shows the same but with the second integral unit turned a predetermined angle so that the first integral unit now is in the same position as the second integral unit has been in FIG. 16.

This turning operation has taken place in FIG. 17 where the previously mentioned turning arrangement has turned the drive shaft 31, and thus the carrier 14 with the support member 14, an angle which by way of example could be 89.5° only, while a correct moulding operation requires the carrier to be turned at all 90°. The remaining 0.5° is turned during closing the injection mould where the surface of the conical taps 15 on the stationary mould half 9 abuts the surface of the conical recesses 16 in the movable mould half as shown in FIG. 6.

The embodiment of a moulding arrangement 1' shown in FIGS. 18-27 corresponds substantially to the embodiment shown in FIGS. 1-17 and for like parts same reference numerals are used and reference made to the description of the corresponding drawings.

Figure 18:
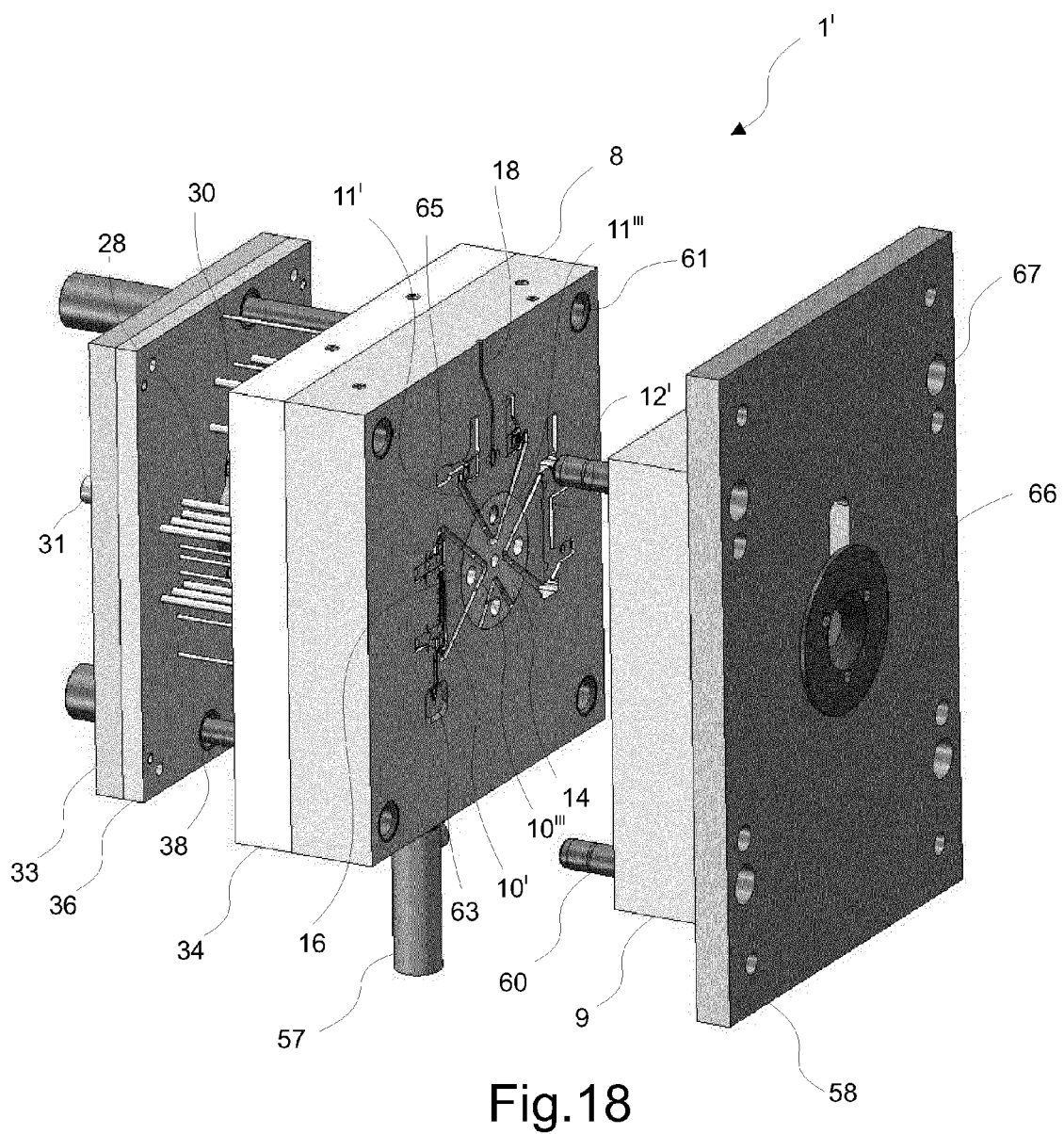
FIG. 18 is a perspective view of another embodiment of the injection moulding arrangement in an open position, seen from the stationary part, prior to starting the moulding process.
Figure 19:
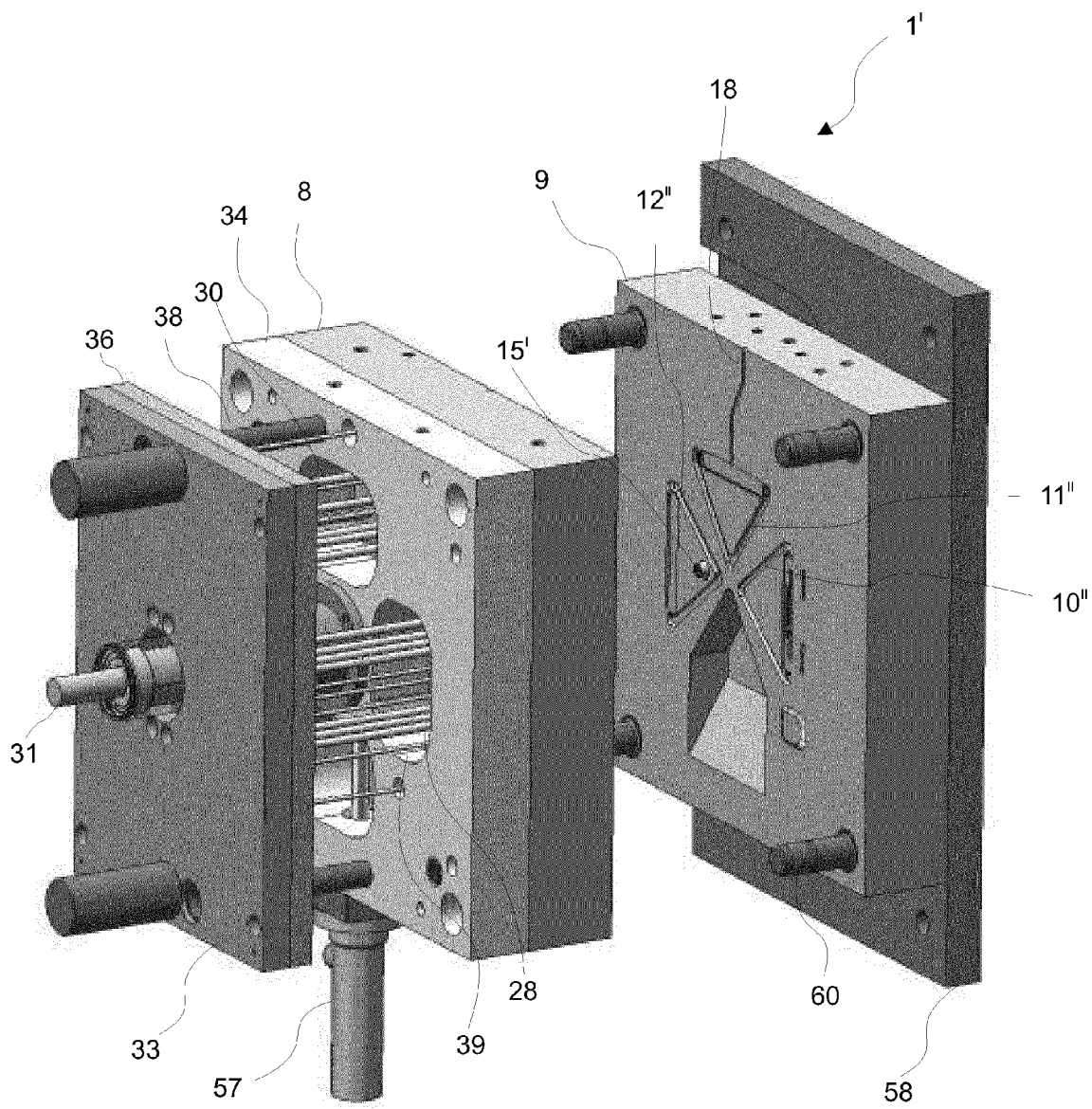
FIG. 19 shows the same, seen from the movable part.
Figure 20:
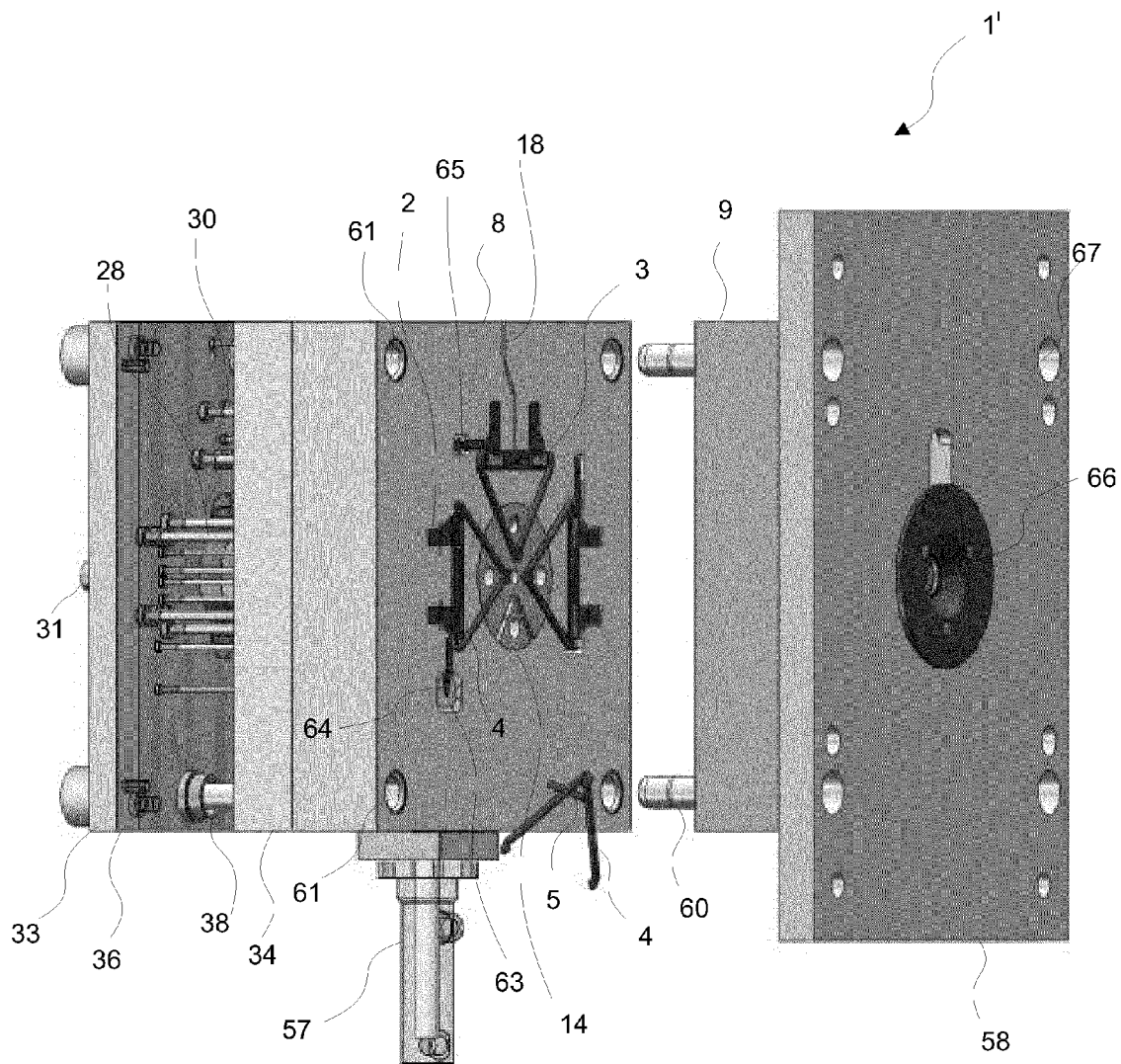
FIG. 20 shows the same in a first open position with retracted ejector pins and in a moulding step of moulding articles using the method according to the invention, and with a severed and rejected support member of a finished moulded article dropping downwards due to gravity.

In FIGS. 18 and 19 another moulding arrangement 1' is shown in an open configuration. The mould halves 8,9 are separated from each other.

The moulding arrangement 1' corresponds substantially by way of structure and function to the moulding arrangement 1 shown and described for the previous FIGS. 1-17, and for like parts same reference numerals are used.

The injection mould 8,9 is shown before any material has been injected. The combined cavity halves 10',11',12' and parts of cavities 10''',11''' of the movable mould half 8 are clearly seen in FIG. 18 and the cavity halves 10'',11'',12'' of the stationary mould half 9 are clearly seen in FIG. 19. When these mould halves are joined the first moulding station for moulding the first integral unit 6 with the support member 4, the second moulding station in which an additional layer is added to the first integral unit 6 to form the second integral unit 7, the third station where support member 4 and any moulding fins are severed from the finished article, and a fourth rejecting station is defined with respective cavities.

Using the orientation seen in FIG. 18 the first station is seen to the left, the second station at the top, the third station to the right, and the fourth station at the bottom. These station are described in detailed above with reference to FIGS. 1-17.

When closing the injection mould 8,9 one conical tap 15' on the stationary mould half serves to engage and rest in conical recess 16 in the movable mould half 8 to secure correct axial and radial orientation of the cavities of respective opposite mould halves. The single conical tap 15' serves same function as the four conical taps and associated conical recesses as described in connection with FIG. 6.

When the first integral unit (not shown) is moulded in the first cavity made up of the first cavity halves 10',10'' and the first part of cavity 10''' first material is injected through the first injection nozzle (not shown) via the separately movable section 14. In other words, the first injection nozzle is situated in the stationary mould half 9 opposite the movable section 14 such that first material can be injected into the first cavity. The part of cavity 10''' is first filled by the first material before the first material flows into the remainder of the cavity.

When assembling and closing the mould halves 8,9 a channel 18 is formed to the exterior, which channel 18 serves as the second injection nozzle 18 for injecting second material into the second cavity made up of the second cavity halves 11',11'' and the second part of cavity 11'''.

In FIG. 20-24 the moulding arrangement 1' is shown when material has been injected into the first and second cavities at the first and second stations.

The ejector plate 36 is for illustrative reasons shown transparent in FIGS. 20-27.

When the mould halves 8,9 are closed, at the first station the first integral unit 6 comprising the first component 2, the support member 4, and the anchor pin 5 is moulded in the first cavity. Any surplus of first material flows into the overflow cavity 63 forming a moulding fin 64 extending in substantially same plane as the first component and thus not in the way during turning the carrier 14.

Figure 21:
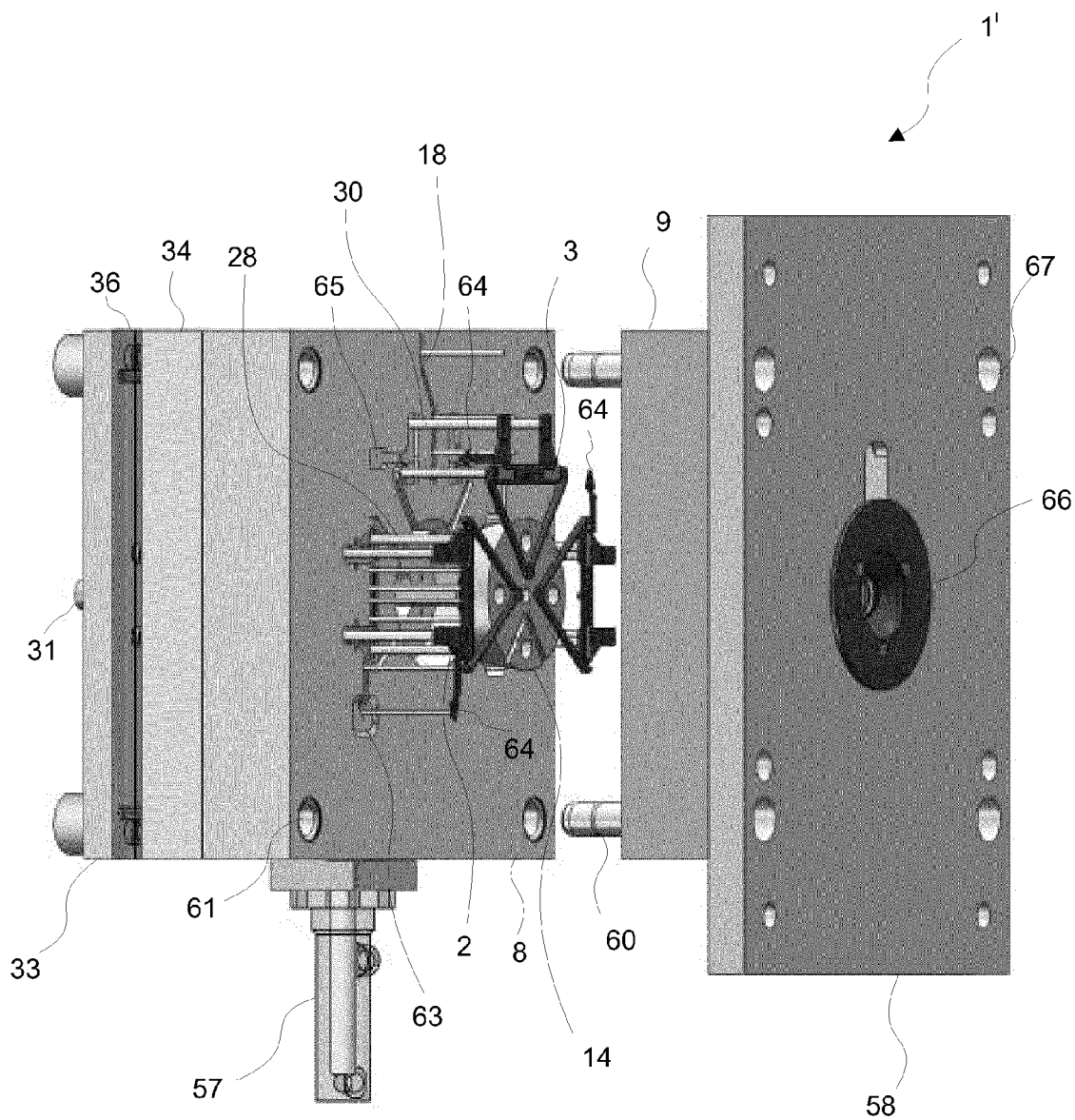
FIG. 21 shows the same in a second open position with forwarded ejector pins having pushed the integral units free for the subsequent turning by the carrier part in a subsequent moulding station.

The mould halves 8,9 are open and the movable section 14 extends from the movable mould half 8. At the same time, the ejector plate 36 with all the ejector pins 28 is pushed forward. The movable section 14 together with the ejector pins 28 then lift the first integral unit 6 free of the first cavity half 10' at the first station, the second integral unit 7 free of the second cavity half 11', and a further second integral unit 7 free of the third cavity half 12' at the third station, as seen in FIG. 21.

Figure 22:
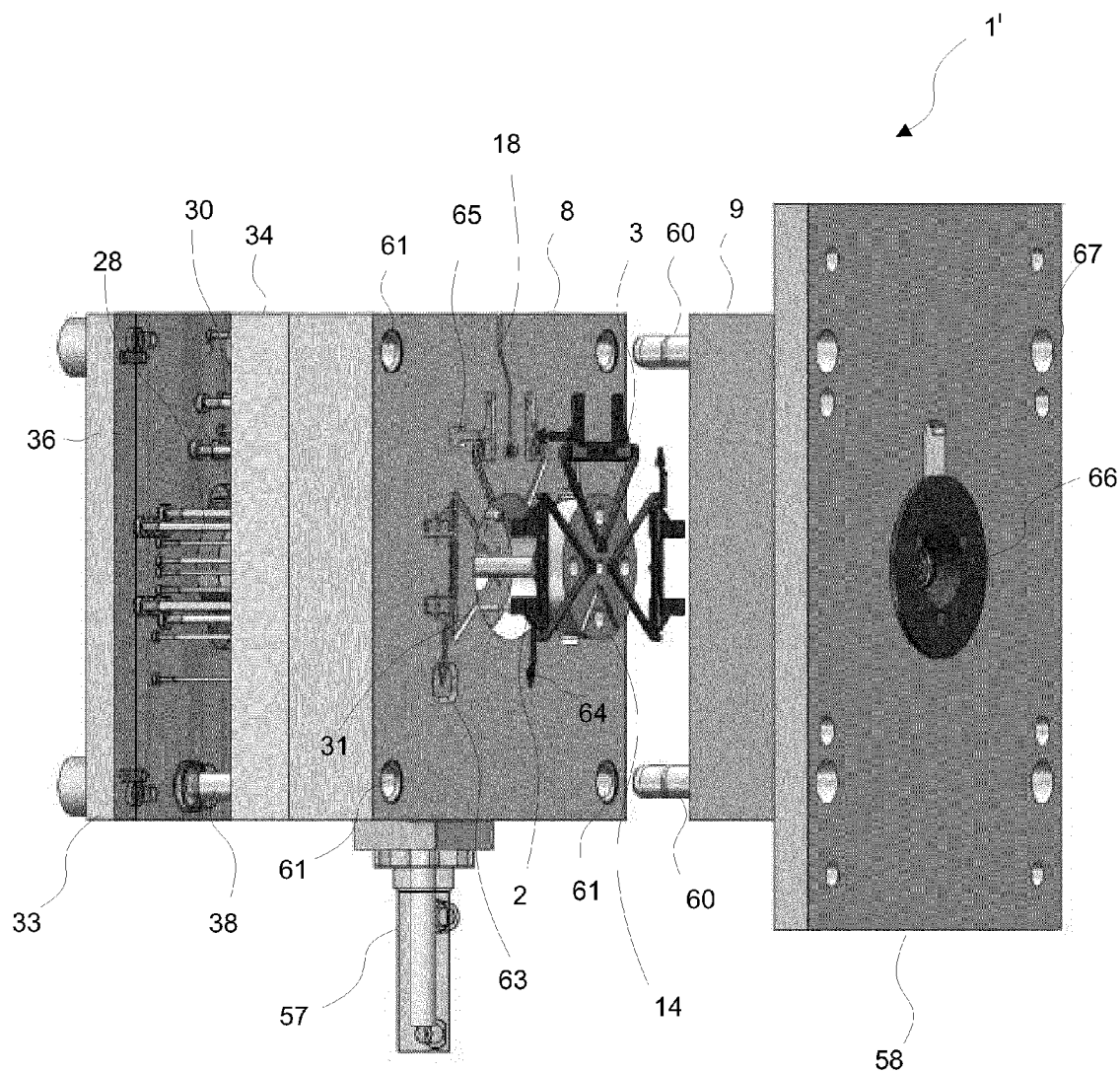
FIG. 22 shows the same in a third open position where the carrier has been extended and the ejector pins are retracted.

The ejector plate 36 and the ejector pins 28 are then withdrawn as seen in FIG. 22.

Figure 23:
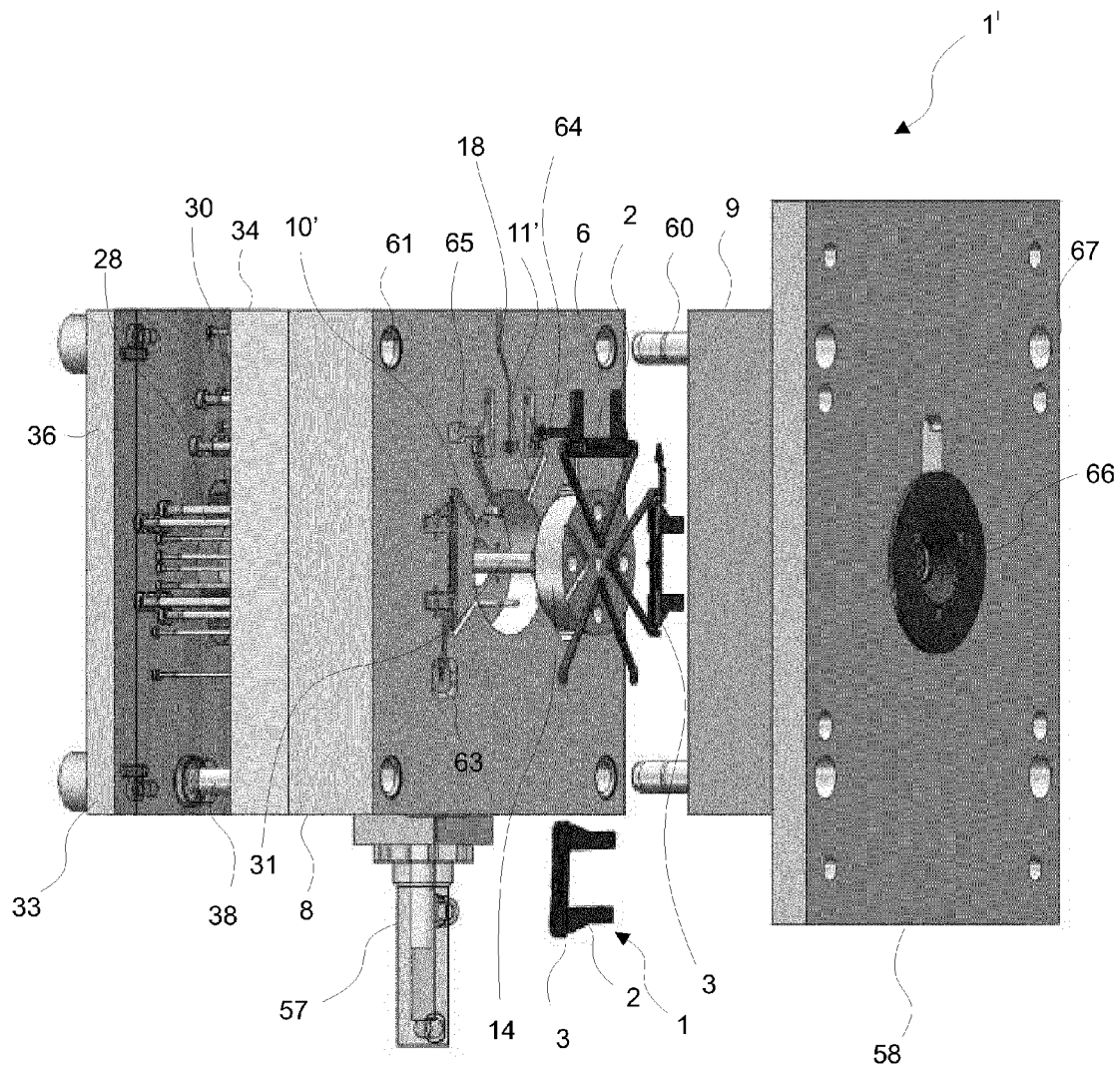
FIG. 23 shows the same seen from the stationary part and in the third open position, where the carrier is rotated 90° and the finished article is cut off and the support member still is attached to the carrier.

The movable section 14 is in FIG. 23 seen rotated about 90° by activating the hydraulic cylinder 57 so that the toothed bar (not shown) acts on the gearwheel rim (not shown) and rotates the drive shaft 31 and the movable section 14.

Figure 24:
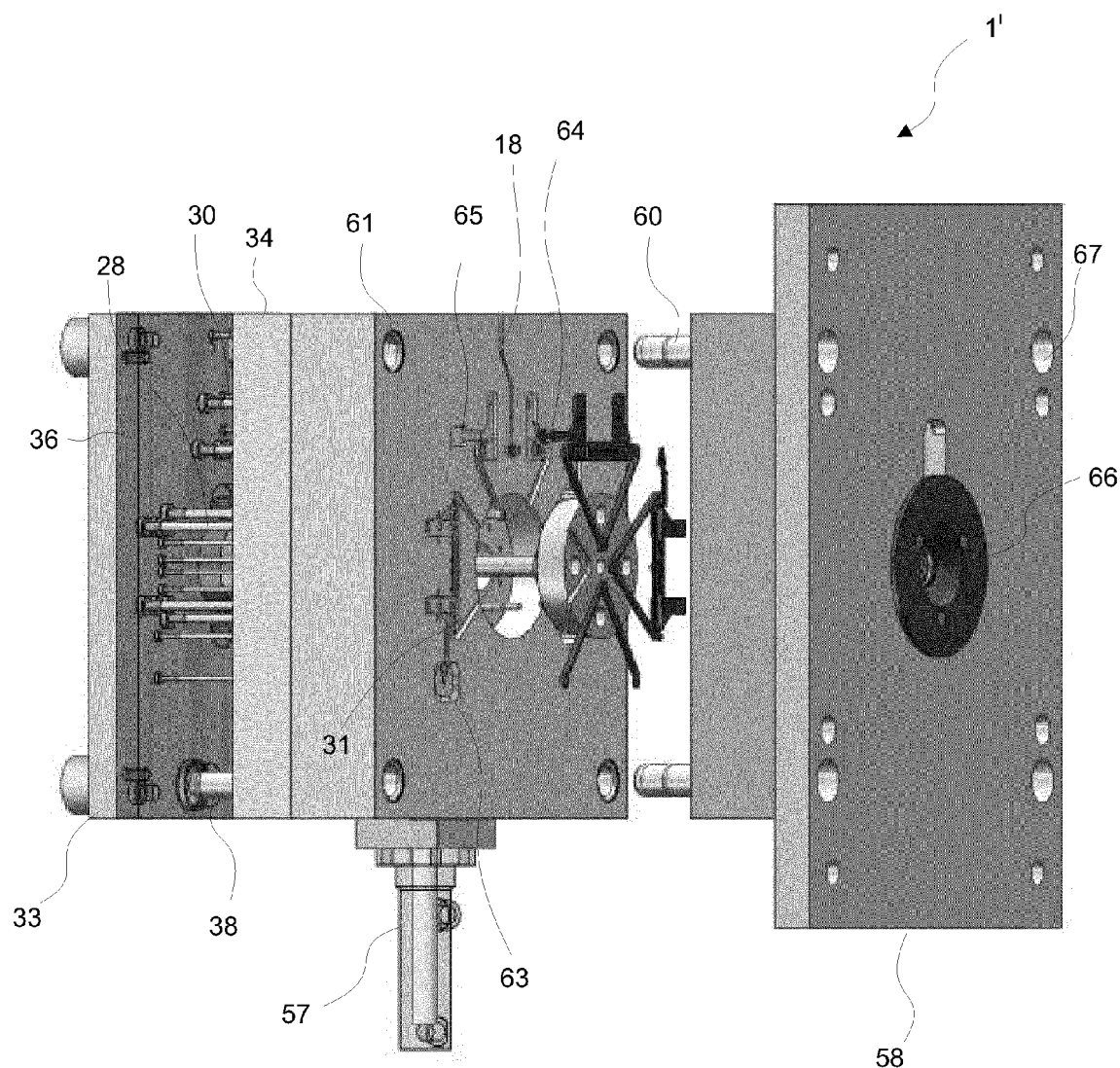
FIG. 24 shows the same in the third open position, where the hydraulic cylinder controlling the rotation of the carrier has been retracted to the start position of the hydraulic cylinder.

In FIG. 24 the hydraulic cylinder 57 is retracted without rotating the movable section 14, as explained above. At the fourth station the bottom support member 4 is still anchored to the carrier 14 by means of its respective anchor pin but is ready for being ejected by an ejector pin and drop out by virtue of gravity.

Figure 25:
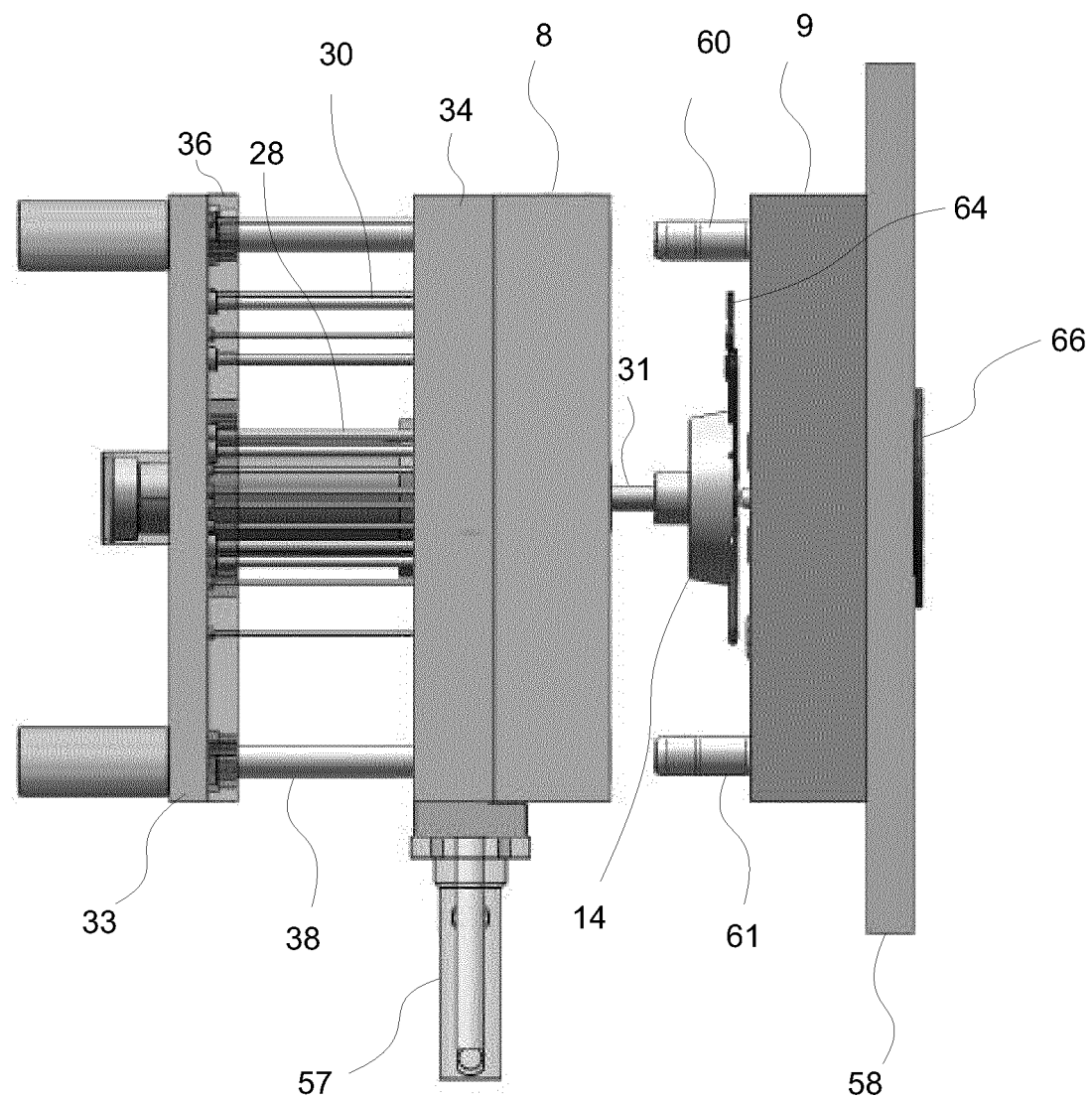
FIG. 25 shows the same in the third open position and seen from the side.

The same situation as in FIG. 24 is shown in FIG. 25 but from a side perspective. No axially extending sprues or moulding fins protrudes into the open gap between the moveable mould part 8 and the stationary mould part 9. Only the moulding fins are left to be severed at the third station together with the support member.

Figure 26:
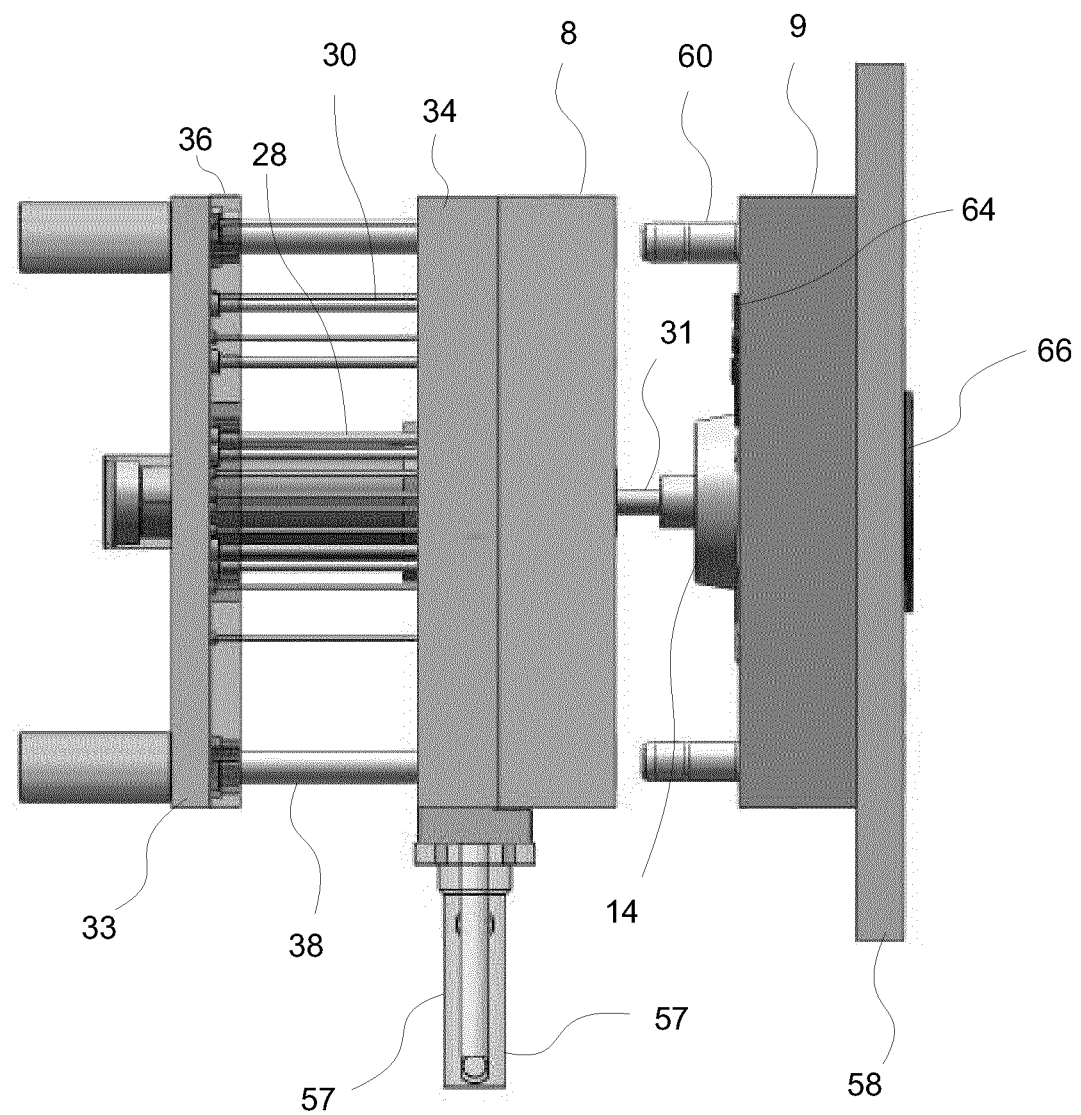
FIG. 26 shows the same, where the carrier has been extended further to closely abut the stationary mould half.

In FIG. 26 the movable section 14 extends further towards the stationary mould part 9, so that the movable section 14 and the stationary mould half 9 are assembled pressing the first integral unit 6 between the movable section 14 and the stationary mould half 9 up against said stationary mould half 9.

Figure 27:
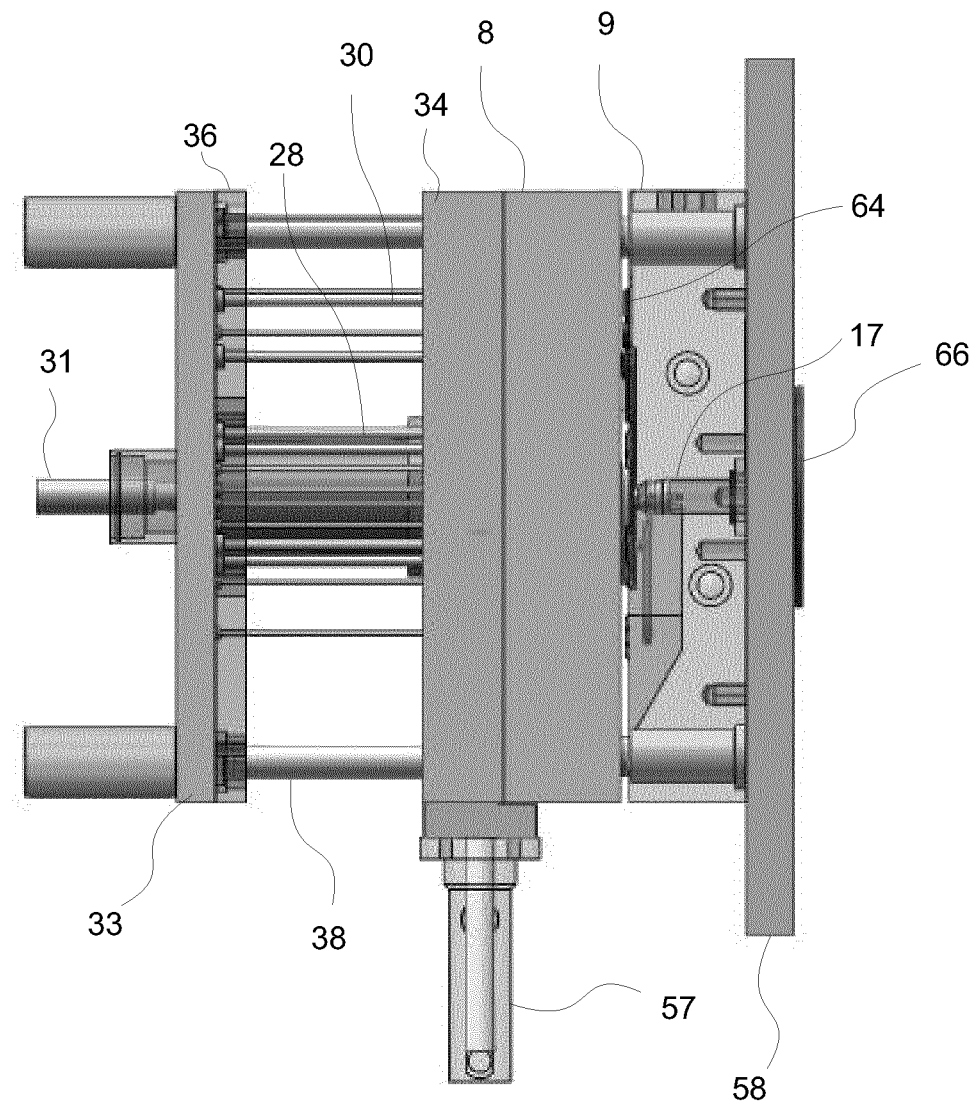
FIG. 27 shows, seen from the same side with a transparent stationary mould half for visualising purposes, the closed mould and the ejector pins retracted to allow the second material to be injected via a nozzle extending through said stationary mould half.

In FIG. 27 the mould halves 8,9 are closed again. The first integral unit 6, which previously was at the first station is now placed in the second cavity and have reached the second station. A second overflow cavity 65 receives the moulding fin 64 made at the first station, see FIG. 23.

When the mould halves 8,9 are closed again second material can be injected through the second injection nozzle 18 into the second cavity already partly filled by the first integral unit 6. That part of the second cavity that is not already filled will now be filled by to allowable degree by injected second material.

When the second material has cooled off the mould halves 8,9 are opened and the moulded part, which has now become the second integral unit 7 is ejected by the movable section 14 and the ejector pins 30, see FIG. 21. This is done in the same way as the first integral unit 6 was ejected at the first station.

The procedures to go from the second station to the third station and from the third station to the fourth station are the same as when going from the first station to the second station.

At the third station, the article 1 and the support member 4 and the article 1 and the moulding fin 64 are separated from each other by cutting by reciprocating or protruding knives (not shown). The knives are situated in the movable mould half 8 extending out from the surface of the movable mould half 8, which turns towards the stationary mould half 9. Each time the mould halves 8,9 are closed the second integral unit 7 positioned in the third station will be parted by the knives into the article 1, the support member 4 with the anchor pin 5 and the moulding fin 64.

When the mould halves 8,9 are opened again the article 1 and the moulding fin 64 will fall down at the fourth station and collected. Then the support member 4 is ejected by an ejector pin (not shown). Alternatively the moulding fin could be sucked out to the side via the third station once the moulding halves open.

The stationary mould half 9 is for illustrative reasons shown transparent in FIG. 27. Because of the transparency the first injecting nozzle 17 is seen. The position of the injecting nozzle 17 means that first material is injected directly into the part of the first cavity where the support member 4 is moulded.

The person skilled in the art will understand that the mould halves 8,9 of the moulding arrangement 1' are clamped to the stationary platen and front platen of the injection moulding. To that aspect e.g. the clamping plate 58 has a central bore 66 and guide holes 67 for complementarily shaped fixing means (not shown) of a stationary platen.

The injection mould halves are always lined precisely up in relation to each other each time the injection mould is closed so that identical articles of high quality always are produced.

Above is described and in the drawing shown that the article to be produced by the injection moulding arrangement of the invention is composed of two components.

Within the scope of the invention the article can also be composed of more components, for example three components.

In this case the injection mould will comprise three cavities for moulding three integral units.

Also the support member can at the same time support components of more articles, which even not need be identical.

What is claimed is:

1. A moulding arrangement for an injection-moulding machine, wherein:
    the injection moulding arrangement is configured for moulding at least one article composed of components of at least two different materials,
    the injection moulding arrangement comprises an injection mould having a movable mould half and a stationary mould half, which mould halves in a closed position of the injection mould define at least two cavities for injecting the different materials for the respective components moulded at each stroke of an injection-moulding machine,
    in the closed position of the injection mould the at least two cavities correspond to the shape of one or more of the components of the at least one article, and the support member,
    the at least two cavities are arranged at angular distance from each other,
    the at least two cavities are arranged at equal distances from a central axis of the injection mould,
    parts of the at least two cavities are formed in a separately movable section of the movable mould half of the injection mould, wherein the at least two cavities are configured to: (a) mould part of at least one component of the article and part of a support member for supporting the at least one component forming a first integral unit, (b) mould another component on the first integral unit forming a second integral unit comprising the at least one article and the support member and (c) retain the support member in a part of the at least two cavities after the moulded article is ejected from the injection mould, and wherein a portion of the support member cavity part is located in the separately movable section and another portion of the support member cavity part extends outside the separately movable section, and
    the injection moulding arrangement comprises an operation part for in an open position of the injection mould displacing said separately movable section to-and-fro between an extended position and a non-extended position, wherein:
        in the open position of the injection mould the separately movable section is adapted to be turned about said central axis by an angle corresponding to the angular distance between the at least two cavities so that:
        in the closed position of the injection mould the parts of the at least two cavities in the movable section together with cavity halves in the remainder of the movable mould half and in the stationary mould half form the at least two cavities.

2. A moulding arrangement according to claim 1, where the article is composed of at least one first component made of a first material and at least one second component made of a second material, wherein the injection mould is formed with:
    a first cavity for moulding a first integral unit consisting of the at least first component and the support member, and
    a second cavity for moulding a second integral unit consisting of the first integral unit and the at least second component.

3. A moulding arrangement according to claim 2, wherein the injection moulding arrangement comprises:
    at least one first injection nozzle for injecting the first material directly into the first cavity during each stroke of the injection-moulding machine, and
    at least one second injection nozzle for simultaneously injecting the second material directly into the second cavity.

4. A moulding arrangement according to claim 3, wherein at least one of the first injection nozzle and the second injection nozzle is arranged for injecting the first material or the second material, respectively, directly into that part of the respective cavities which corresponds to the shape of the support member.

5. A moulding arrangement according to claim 3, wherein that each first injection nozzle and second injection nozzle is a heat runner.

6. A moulding arrangement according to claim 3, wherein the support member is arranged as a sprue for allowing the first material from the first injection nozzle to be supplied to that part of the first cavity, which corresponds to the first component, and as a sprue for allowing the second material from the second injection nozzle to be supplied to that part of the second cavity, which corresponds to the second component.

7. A moulding arrangement according to claim 2, wherein the operation part comprises an axially displaceable ejector plate with ejector pins for in the open position of the injection mould ejecting the first and second moulded integral unit from the movable mould half but not the support member from the carrier.

8. A moulding arrangement according to claim 1, wherein the operation part comprises an axially displaceable drive shaft that is connected to the carrier.

9. A moulding arrangement according to claim 8, wherein the operation part is adapted to displace the drive shaft in the open position of the injection mould towards the stationary mould half so that the carrier is placed between the two mould halves in a position where the support members on the carrier have brought the integral unit beyond the reach of the ejector pins.

10. A moulding arrangement according to claim 8, wherein the operation part comprises a gearwheel rim mounted upon the drive shaft and a toothed bar meshing with the gearwheel rim.

11. A moulding arrangement according to claim 10, wherein the gearwheel rim is mounted upon the drive shaft via a free-wheeling hub adapted to allow the gearwheel rim to turn the drive shaft into one direction of rotation but not into the opposite direction of rotation.

12. A moulding arrangement according to claim 10, wherein the free-wheeling hub is arranged as a free-wheeling roller bearing.

13. A moulding arrangement according to claim 10, wherein the operation part of the injection moulding arrangement comprises a tubular sleeve whereby the gearwheel rim is placed turnable in the tubular sleeve with the teeth of the gearwheel rim slidingly abutting an inner side of the sleeve.

14. A moulding arrangement according to claim 13, wherein the wall of the tubular sleeve has a transverse opening for allowing the toothed bar to mesh with the gearwheel rim.

15. A moulding arrangement according to claim 1, wherein the operation part of the injection moulding arrangement is adapted to turn the carrier less than the angle between neighbouring cavities in the injection mould whereby the remainder of the turning operation is performed by means of at least one conical tap which is mounted upon the stationary mould and is engaging a corresponding recess formed in the carrier when closing the injection mould.

16. A method for producing an article composed of a first and a second component made of each their material by an injection moulding arrangement comprising:
an injection mould having a movable mould half and a stationary mould half, which mould halves in a closed position of the injection mould define at least two cavities for injecting the different materials for the respective components moulded at each stroke of an injection-moulding machine, wherein:
in the closed position of the injection mould, the at least two cavities correspond to the shape of one or more of the components of the at least one article,
the at least two cavities are arranged at angular distance from each other,
the at least two cavities are arranged at equal distances from a central axis of the injection mould, and
parts of the at least two cavities are formed in a separately movable section of the movable mould half of the injection mould, and
an operation part for in an open position of the injection mould displacing said separately movable section to-and-fro between an extended position and a non-extended position, wherein:
in the open position of the injection mould the separately movable section is adapted to be turned about said central axis an angle corresponding to the angular distance between the at least two cavities,
in the closed position of the injection mould, the parts of the at least two cavities in the movable section together with cavity halves in the remainder of the movable mould half and in the stationary mould half form the at least two cavities,
wherein the method comprises, for each operation cycle:
injecting the different materials into the at least two cavities of the closed injection mould, where injection of the material into one of the at least two cavities is made via the separately movable section,
opening the injection mould,
ejecting a first and second integral unit from the movable mould half without ejecting a support member from the carrier,
displacing the carrier a distance further than ejector pins of an axially displaceable ejector plate,
closing the injection mould, and
ejecting the support member from the injection mould during closing of the injection mould.

17. A method according to claim 16, which simultaneously comprises:
moulding the first integral unit,
moulding the second integral unit, and
severing the article from the support member during closing the injection mould.

18. A method according to claim 16, which further comprises retracting the ejector pins.

19. A method according to claim 16, wherein a material is injected directly into the respective cavities of the injection mould.

20. A method according to claim 19, wherein part of the material is injected directly into at least one part of the respective cavities of the injection mould which corresponds to the shape of the support member.

21. A moulding arrangement for an injection-moulding machine, comprising:
the injection moulding arrangement is configured for moulding at least one article composed of components of at least two different materials,
the injection moulding arrangement comprises an injection mould having a movable mould half and a stationary mould half, which mould halves in a closed position of the injection mould define at least two cavities for injecting the different materials for the respective components moulded at each stroke of an injection-moulding machine,
in the closed position of the injection mould the at least two cavities correspond to the shape of one or more of the components of the at least one article,
the at least two cavities are arranged at angular distance from each other,
the at least two cavities are arranged at equal distances from a central axis of the injection mould, parts of the at least two cavities are formed in a separately movable section of the movable mould half of the injection mould, wherein the injection moulding arrangement further comprises a knife to sever the moulded part between the article and the support member so that the article can be ejected from the mould separately from the support member with the support member remaining in the mould, and the injection moulding arrangement comprises an operation part for in an open position of the injection mould displacing said separately movable section to-and-fro between an extended position and a non-extended position, wherein:

in the open position of the injection mould the separately movable section is adapted to be turned about said central axis by an angle corresponding to the angular distance between the at least two cavities so that:

in the closed position of the injection mould the parts of the at least two cavities in the movable section together with cavity halves in the remainder of the movable mould half and in the stationary mould half form the at least two cavities.

22. A moulding arrangement according to claim 1, further comprising an injection nozzle situated in the stationery mould opposite the separately movable section.

* * * * *